US010399363B2

(12) United States Patent
Furukawa et al.

(10) Patent No.: US 10,399,363 B2
(45) Date of Patent: Sep. 3, 2019

(54) PRINT METHOD, INK SET, AND INKJET PRINT DEVICE

(71) Applicants: Juichi Furukawa, Kanagawa (JP); Masaaki Tsuda, Kanagawa (JP); Hidefumi Nagashima, Kanagawa (JP); Yukihiro Imanaga, Tokyo (JP); Masahiro Kido, Kanagawa (JP); Hikaru Kobayashi, Kanagawa (JP); Yuta Nakamura, Kanagawa (JP)

(72) Inventors: Juichi Furukawa, Kanagawa (JP); Masaaki Tsuda, Kanagawa (JP); Hidefumi Nagashima, Kanagawa (JP); Yukihiro Imanaga, Tokyo (JP); Masahiro Kido, Kanagawa (JP); Hikaru Kobayashi, Kanagawa (JP); Yuta Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 15/634,706

(22) Filed: Jun. 27, 2017

(65) Prior Publication Data

US 2018/0001669 A1 Jan. 4, 2018

(30) Foreign Application Priority Data

Jun. 30, 2016 (JP) ................................ 2016-130879
May 25, 2017 (JP) ................................ 2017-103324

(51) Int. Cl.
*B41M 5/00* (2006.01)
*B41J 11/00* (2006.01)
(Continued)

(52) U.S. Cl.
CPC .......... *B41J 11/002* (2013.01); *C09D 11/322* (2013.01); *C09D 11/38* (2013.01); *C09D 11/40* (2013.01); *B41M 5/0011* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2013/0002776 A1* 1/2013 Nagashima .............. B41M 5/52 347/100
2014/0192112 A1 7/2014 Nagashima et al.
(Continued)

FOREIGN PATENT DOCUMENTS

JP 2006-281570 10/2006
JP 2009-184206 8/2009
(Continued)

OTHER PUBLICATIONS

U.S. Appl. No. 15/436,256, filed Feb. 17, 2017.

*Primary Examiner* — Manish S Shah
(74) *Attorney, Agent, or Firm* — Oblon, McClelland, Maier & Neustadt, L.L.P.

(57) ABSTRACT

A print method includes applying a first ink to a recording medium to form a first ink print layer, drying the first ink print layer to a drying ratio of 30 percent or less, and applying a second ink having a color different from that of the first ink to the first ink print layer to form a second ink print layer thereon, wherein the first ink includes a urethane resin particle and a water-soluble organic solvent having a boiling point of from 100 to 180 degrees C. or β-alkoxy propionamide of Chemical formula I, (I)

(Continued)

where $R_1$ represents a methyl group, an ethyl group, a propyl group, or a butyl group and $R_2$ and $R_3$ each, independently represent alkyl groups having one to six carbon atoms, and the first ink and the second ink includes no organic solvent having a boiling point of 280 degrees C. or higher under 1 atm.

15 Claims, 2 Drawing Sheets

(51) Int. Cl.
*C09D 11/40* (2014.01)
*C09D 11/38* (2014.01)
*C09D 11/322* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 2014/0267520 | A1 | 9/2014 | Toda et al. |
| 2014/0377516 | A1 | 12/2014 | Toda et al. |
| 2015/0017396 | A1 | 1/2015 | Nakagawa et al. |
| 2015/0050467 | A1 | 2/2015 | Nakagawa et al. |
| 2015/0077479 | A1 | 3/2015 | Nakagawa et al. |
| 2015/0077482 | A1 | 3/2015 | Toda et al. |
| 2015/0116433 | A1 | 4/2015 | Fujii et al. |
| 2015/0138284 | A1 | 5/2015 | Nagashima et al. |
| 2015/0165787 | A1 | 6/2015 | Fujii et al. |
| 2015/0191614 | A1 | 7/2015 | Nagashima et al. |
| 2015/0258783 | A1 | 9/2015 | Toda et al. |
| 2015/0259553 | A1 | 9/2015 | Nakagawa et al. |
| 2015/0322201 | A1 | 11/2015 | Arai et al. |
| 2015/0329731 | A1 | 11/2015 | Fujii et al. |
| 2015/0361213 | A1 | 12/2015 | Kamada et al. |
| 2015/0361282 | A1 | 12/2015 | Nakagawa et al. |
| 2015/0368492 | A1 | 12/2015 | Fujii et al. |
| 2016/0032122 | A1 | 2/2016 | Toda et al. |
| 2016/0068697 | A1 | 3/2016 | Toda et al. |
| 2016/0102220 | A1 | 4/2016 | Kido et al. |
| 2016/0264808 | A1 | 9/2016 | Kido et al. |
| 2016/0272834 | A1 | 9/2016 | Kobayashi et al. |
| 2016/0355695 | A1 | 12/2016 | Nakagawa et al. |
| 2017/0015102 | A1 | 1/2017 | Nagashima et al. |
| 2017/0022380 | A1 | 1/2017 | Nakagawa et al. |
| 2017/0051170 | A1 | 2/2017 | Nakagawa et al. |
| 2017/0174919 | A1 | 6/2017 | Kido et al. |

FOREIGN PATENT DOCUMENTS

| | | |
|---|---|---|
| JP | 2009-235155 | 10/2009 |
| JP | 2010-076138 | 4/2010 |
| JP | 2010-158884 | 7/2010 |
| JP | 2011-195613 | 10/2011 |
| JP | 2013-095078 | 5/2013 |
| JP | 2013-177527 | 9/2013 |
| JP | 2014-205768 | 10/2014 |

* cited by examiner

PRINT METHOD, INK SET, AND INKJET PRINT DEVICE

CROSS-REFERENCE TO RELATED APPLICATIONS

This patent application is based on and claims priority pursuant to 35 U.S.C. § 119 to Japanese Patent Application Nos. 2016-130879 and 2017-103324, filed on Jun. 30, 2016 and May 25, 2017, respectively, in the Japan Patent Office, the entire disclosures of which are hereby incorporated by reference herein.

BACKGROUND

Technical Field

The present disclosure relates to a print method, an ink set, and an inkjet print device.

Description of the Related Art

For industrial use in advertisement and signboards, for example, non-permeable recording media such as plastic film are used in order to improve durability for light, water, abrasion, resistance, etc. Naturally, inks for such non-permeable recording media have been developed.

As such inks, for example, solvent-based inks using organic solvents as solvents and ultraviolet-curable inks mainly constituted of polymerizable monomers have been widely used. However, the solvent ink causes a concern about an adverse impact on the environment due to evaporation of organic solvents. The ultraviolet curing ink has a limited choice of polymerizable monomers in terms of safety in some cases.

For this reason, ink sets including aqueous ink capable of direct recording on non-permeable recording media have been proposed.

Such non-permeable media are demanded particularly when white images are formed as backdrop on transparent film by an inkjet recording method to form printed matter thereon. As the inkjet recording method, there are a first recording method and a second print method. The first recording method includes forming a white image on a recording medium with a white ink (first recording process), drying the white image, and thereafter forming a non-white image on the white print layer with an ink including a non-white coloring material (second print process). The second print method includes forming a non-white print layer on a recording medium with an ink including a non-white coloring material (first print process), drying the non-white print layer, and thereafter forming a white print layer on the non-white print layer with a white ink (second print process).

As for the aqueous ink, for example, an inkjet recording method has been proposed which includes a first recording process of recording a white image on a recording medium with a white ink including no alkyl polyol having a boiling point of 280 degrees C. of higher under 1 atmospheric pressure, a drying process of drying the white image to a drying ratio of to 80 percent, and a second recording process of recording a colored image on the white image with a drying ratio of 40 to 80 percent by an inkjet method using a colored ink having a surface tension of 30 mN/m or lower, including a coloring material, and including no alkyl polyol having a boiling point of 280 degrees C. or higher under 1 atmospheric pressure.

In this technology, the white ink and the colored ink make an ink set including no alkyl polyol having a boiling point of 280 degrees C. or higher, thereby shortening the drying time of both inks. However, to achieve the drying ratio of 40 to 80 percent, it is required to set a long drying time.

As described above, such a limited selection of an organic solvent having a relatively low boiling point in ink is known as a measure to increase the drying speed. However, blurring of printed matter is not sufficiently suppressed.

SUMMARY

According to an embodiment of the present invention, provided are an improved print method which includes applying a first ink to a recording medium to form a first ink print layer, drying the first ink print layer to a drying ratio of 30 percent or less, and applying a second ink having a color different from the color of the first ink to the first ink print layer dried to the drying ratio of 30 percent or less to form a second ink print layer thereon, wherein the first ink includes a urethane resin particle and a water-soluble organic solvent having a boiling point of from 100 to 180 degrees C. or β-alkoxy propionamide represented by the following Chemical formula I,

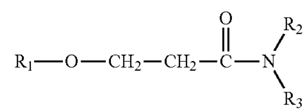

(I)

where $R_1$ represents a methyl group, an ethyl group, a propyl group, or a butyl group and $R_2$ and $R_3$ each, independently represent alkyl groups having one to six carbon atoms, and the first ink and the second ink includes no organic solvent having a boiling point of 280 degrees C. or higher under 1 atmospheric pressure.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1:
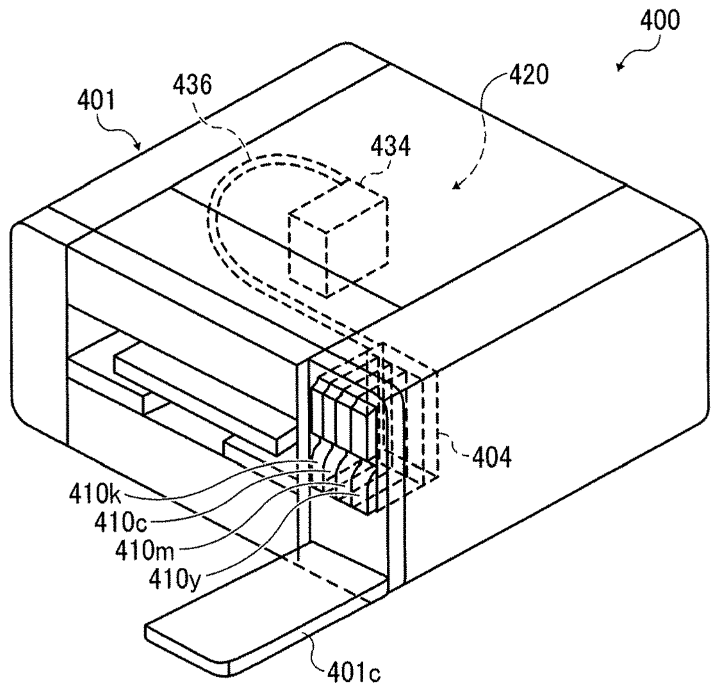
FIG. 1 is a diagram illustrating a perspective view illustrating an example of a serial type image forming apparatus.

The present disclosure relates to the print method of the following 1 and also includes the following 2 to 10 as embodiments.

1. A print method includes applying a first ink to a recording medium to form a first ink print layer, drying the first ink print layer to a drying ratio of 30 percent at most (30 percent or less); and applying a second ink having a color different from the color of the first ink to the first ink print layer dried to the drying ratio of 30 percent at most to form a second ink print layer on the first ink print layer, wherein the first ink includes a water-soluble organic solvent having a boiling point of from 100 to 180 degrees C. or β-alkoxy propionamide represented by the following Chemical formula I and a urethane resin particle, wherein the first ink comprises a water-soluble organic solvent having a boiling point of from 100 to 180 degrees C. or β-alkoxy propionamide represented by the following Chemical formula I and a urethane resin particle, (I)

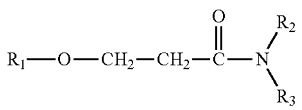

where $R_1$ represents a methyl group, an ethyl group, a propyl group, or a butyl group and $R_2$ and $R_3$ each, independently represent alkyl groups having one to six carbon atoms, and wherein the first ink and the second ink comprise no organic solvent having a boiling point of 280 degrees C. or higher under 1 atmospheric pressure.

2. The print method according to 1 mentioned above, wherein the first ink includes a white coloring material or a clear ink comprising no coloring material and the second ink includes non-white coloring material.
3. The print method according to 1 mentioned above, wherein the first ink includes a non-white coloring material and the second ink includes a white coloring material or a clear ink including no coloring material.
4. The print method according to any one of 1 to 3 mentioned above, wherein the water-soluble organic solvent includes propylene glycol monomerthylether, methoxybutanol, or 3-methyl-3-methoxy butanol.
5. The print method according to any one of 1 to 4 mentioned above, wherein the urethane resin particle includes water-dispersible particulate.
6. The print method according to any one of 1 to 5 mentioned above, wherein the urethane resin particle includes a polyether-based urethane resin particle or a polycarbonate-based urethane resin particle.
7. The print method according to 6 mentioned above, wherein the urethane resin particle has a glass transition temperature not higher than a temperature of the recording medium when the first ink lands on the recording medium.
8. The print method according to 7 mentioned above, wherein the urethane resin particle has a glass transition temperature of 60 degrees C. or lower.
9. The print method according to 7 mentioned above, wherein the urethane resin particle includes a water-dispersible urethane resin particle having a glass transition temperature of 0 degrees C. or lower.
10. The print method according to any one of 1 to 9 mentioned above, wherein the recording medium includes a non-permeable substrate absorbing little or no water.
11. An ink set of the first ink and the second ink for use in the print method of any one of 1 to mentioned above.
12. An inkjet recording device includes the ink set of 11 mentioned above and a recording head to discharge the first ink and the second ink in the ink set.

In the print method of the present disclosure, an ink set of a first ink and a second ink having a color different from that of the first ink is used.

The first ink contains a white ink containing a white coloring material or a clear ink containing no coloring material and the second ink contains a no-white ink containing a non-white coloring material.

The first ink contains a non-white ink containing a non-white coloring material and the second ink contains a white ink containing a white coloring material or a clear ink containing no coloring material.

Hereinafter, an ink set having a combination of the white ink as the first ink and the non-white ink as the second ink is described as an example of the present disclosure.

White Ink

The white ink includes a water-soluble organic solvent having a boiling point of from 100 to 180 degrees C. or β-alkoxy propionamide represented by the following Chemical formula I and urethane resin. Also, the white ink includes no organic solvent having a boiling point of 280 degrees C. or higher under 1 atmospheric pressure.

Chemical formula I (I)

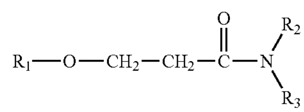

In the Chemical formula I, $R_1$ represents a methyl group, an ethyl group, a propyl group, or a butyl group and $R_2$ and $R_3$ each, independently represent alkyl groups having one to six carbon atoms.

Non-White Ink

The non-white ink includes a non-white coloring material and an organic solvent including no organic solvent having a boiling point of 280 degrees C. or higher under 1 atmospheric pressure.

The print method of the present disclosure includes a first print process of forming a print layer of the white ink on a recording medium, a drying process of drying the print layer of the white ink to a drying ratio of 30 percent at most (30 percent or less), and a second print process of forming a print layer of the non-white ink on the print layer of the white ink having a drying ratio of 30 percent or less.

The drying ratio in the present disclosure means a state based on a drying ratio of 0 percent meaning not dried at all and a drying ratio of 100 percent where the drying mass does not decrease at all in further drying.

Using the ink set, printed matter free of color bleed can be formed even when the drying ratio of the ink used for previous printing is 30 percent or less. Therefore, there is no trade-off between high performance and quality image.

According to the present disclosure, images free of color bleed can be produced at a drying ratio lower than that of a typical case. Therefore, there is no particular limit to the lower limit of the drying ratio. It is preferably 1 percent or more, more preferably 5 percent or more, furthermore preferably 10 percent or more, and particularly preferably 15 percent or more. This can be suitably determined depending on the film thickness of white layer, print speed, and required image quality.

The mechanism of the impact of the components contained in the white ink of the present disclosure is described below, but is an inference. It does not limit the scope of the present disclosure.

The urethane resin particle contained in the white ink is described first.

The white ink in the present disclosure contains a solvent having a relatively low boiling point and the urethane resin particle. The urethane resin particle during drying of the white ink is thought to form a solid thin layer at the interface between liquid and air in an extremely short time. For this reason, even when a massive amount of the solvent remains inside the ink droplets (specifically, the drying ratio is 30 percent or less), the film of the solid portion of the surface inhibits mixing so that succeeding landing of the ink is thought not to cause color bleed. In particular, urethane resin particles tend to form a film at low drying ratios.

As the urethane resin, polycarbonate-based urethane resins or polyether-based urethane resins are preferable because obtained images have high gloss and robustness.

In the case of a water-soluble resin, film-forming does not start until a solvent evaporates to some degree. Therefore, to prevent color bleed, it is not possible to start the second print process until the film is sufficiently dried (high drying ratio). To obtain images free of color bleed, the drying time becomes long to increase the drying ratio, which has an adverse impact on the print speed.

However, since the urethane resin particle easily form film at low drying ratios, the drying time becomes short. Therefore, high performance is made possible.

In addition, the present inventors have found that the degree of color bleed varies depending on the difference between the glass transition temperature (Tg) of the urethane resin contained in ink discharged in the first print process and the heating temperature of a recording medium. If the glass transition temperature of the resin contained is low to the heating temperature, color bleed little or never occurs.

Considering that the upper limit of the heating temperature of a transparent film is desirably around 60 degrees C., the glass transition temperature of the resin in the ink is preferably 60 degrees C. or lower. Color bleed tends not to occur as the glass transition temperature lowers. Furthermore, if the glass transition temperature of the resin contained in the ink is 0 degrees C. of lower, color bleed little or never occurs. Since sensitivity effective to form film of ink at room temperature is present when the glass transition temperature is around 0 degrees C., film forming initializes at low temperatures before the temperature of the ink arises after the ink lands on a recording medium. Considering that film-forming starts before the temperature of the ink rises, film can be formed in a short time so that color bleed is thought to little or never occur.

Next, β-alkoxy propionamide represented by the following Chemical formula I contained in the white ink is described.

Chemical formula I

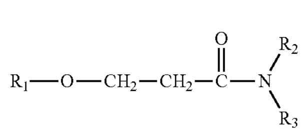

(I)

In the Chemical formula I, $R_1$ represents a methyl group, an ethyl group, a propyl group, or a butyl group and $R_2$ and $R_3$ each, independently represent alkyl groups having one to six carbon atoms.

The water-dispersible urethane resin particle during drying of the white ink is thought to form a solid thin layer at the interface between liquid and air in an extremely short time by β-alkoxy propionamide serving as a film-forming helping agent. In addition, the vapor pressure is relatively low as an amide solvent goes and tends to become dry. For this reason, with a focus on drying ratio, even when a massive amount of the solvent remains inside the ink droplets (specifically, the drying ratio is 30 percent or less), the solid film of the surface inhibits mixing so that succeeding landing of the ink is thought not to cause color bleed. In particular, urethane resin particles tend to form a film at low drying ratios.

Of β-alkoxy propionamides represented by the following Chemical formula I, color bleed is suitably prevented when $R_1$, $R_2$, and $R_3$ are methyl groups, which is 3-methoxy-N,N-dimethyl propaneamide.

The present inventors infer that 3-methoxy-N,N-dimethyl propaneamide is a solvent having a SP value of from 10.3 to 12.8, which is close to 11 to 12 of the SP value of urethane resin so that film is easily formed.

In addition, the white ink in the present disclosure includes no organic solvent having a boiling point of 280 degrees C. or higher under 1 atmospheric pressure. In addition, the non-white ink in the present disclosure includes no organic solvent having a boiling point of 280 degrees C. or higher under 1 atmospheric pressure, Each ink constituting the ink set contains no organic solvent having a boiling point of 280 degrees C. or higher under 1 atmospheric pressure, both of the white ink and the non-white ink can be dried sooner.

Using the ink set including such inks, printed matter sufficiently free of color bleed can be formed even when the drying ratio of the ink for use in previous printing is 30 percent or less. Therefore, there is no trade-off between high performance and quality image. Moreover, the drying ratio of the ink for use in previous printing is 30 percent of less and it is also possible to make it less than 30 percent or 20 percent or less.

Surfactant

Polysiloxane Surfactant

The ink set of the present disclosure may contain a polysiloxane surfactant. As the polysiloxane-based surfactants, for example, the following is preferable: a compound (silicone-based compound) having a hydrophilic group or a hydrophilic polymer chain in the side chain of a compound having a polysiloxane backbone such as polydimethylsiloxane; and a compound having a hydrophilic group or a hydrophilic polymer chain at its distal end of a compound (silicone-based compound) having a polysiloxane backbone such as polydimethylsiloxane. The polysiloxane surfactant means a compound having a polysiloxane backbone in its structure and includes a polysiloxane surfactant.

Examples of the hydrophilic group and the hydrophilic polymer chain include polyether groups (polyethyleneoxide, polypropylene oxide, and copolymers thereof), polyglycerin ($C_3H_6(CH_2CH(OH)CH_2O)_n$—H, etc.), pyrolidone, betaine ($C_3H_6W(C_2H_4)_2$—$CH_2COO^-$, etc.), sulfates ($C_3H_6O(C_2H_4O)_n$—$SO_3Na$, etc.), phosphates ($C_3H_6O(C_2H_4O)_n$—P(═O)OHONa, etc.), and quaternary salts ($C_3H_6N^+(C_2H_4)_3Cl^-$, etc.). In the chemical formulae, n represents an integer of 1 and above. Of these, compounds having a polyether group are preferable.

In addition, a vinyl-based copolymer is also preferable which has a silicone-based compound chain such as polydimethylsiloxane in its side chain, which is obtained by copolymerization of a polydimethylsiloxane having a polymerizable vinyl group at its distal end and a copolymerizable monomer (it is preferable to at least partially use a hydrophilic monomer such as a (meth)acrylic acid or its salt in the monomer).

Of these, compounds having a polysiloxane backbone and a hydrophilic polymer chain are preferable. More preferred are compounds having a polyether group as the hydrophilic polymer chain. In addition, a non-ionic surfactant is particularly preferable in which a polysiloxane surfactant has methyl polysiloxane as a hydrophobic group and a polyoxyethylene backbone as a hydrophilic group.

Examples of the polysiloxane surfactant include polyether-based silicone and silicone compounds having a polyoxyalkylene group.

The polysiloxane surfactant is available on the market. Specific example include, but are not limited to, Silface SAG005 (HLB value: 7.0) and Silface SAG008 (HLB value: 7.0), both are manufactured by Nisshin Chemical Co., Ltd., FZ2110 (HLB value: 1.0, FZ2166 (HLB value: 5.8), SH-3772M (HLB value: 6.0), L7001 (HLB value: 7.4), SH-3773M (HLB value: 8.0), all of which are manufactured by Dow Corning Toray Co., Ltd.), KF-945 (HLB value: 4.0), and KF-6017 (HLB value: 4.5), both of which are manufactured by Shin-Etsu Chemical Co., Ltd., and FormBan MS-575 (HLB value: 5.0), manufactured by Ultra Additives Inc.).

The proportion of the polysiloxane surfactant is preferably from 0.1 to 4.0 percent by mass and more preferably from 0.2 to 2.0 percent by mass to the total content of ink.

When the proportion is from 0.1 to 4.0 percent by mass, fixability of ink onto a non-permeable recording medium can be improved and image quality such as gloss can be improved.

The polysiloxane surfactant is not particularly limited as long as it is used for ink and paint. It is preferable to use a surfactant represented by the following Chemical formula 1 or 2 to obtain good discharging stability and print quality. In addition, it is possible to obtain better discharging stability if a surfactant represented by the following Chemical formula 3 is used in combination.

Chemical formula 1

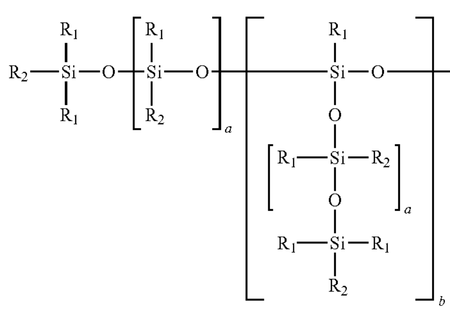

(1)

In the Chemical formula 1, a represents an integer of from 1 to 500 and b represents 0 or an integer of from 1 to 10. $R_1$ represents an alkyl group or an aryl group. $R_2$ is a substitution group selected from the group consisting of the group represented by the following Chemical formula A, the group represented by the following Chemical formula B, the group represented by the following Chemical formula C, an alkyl group, and an aryl group. At least one of $R_2$ is the group represented by the following Chemical formula A.

Chemical formula A

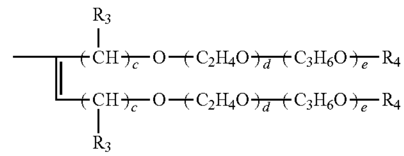

(A)

In the Chemical formula A, c represents an integer of from 1 to 20, d is 0 or an integer of from 1 to 50, and e is 0 or an integer of from 1 to 50. $R_3$ represents a hydrogen atom or an alkyl group and $R_4$ represents a hydrogen atom, an alkyl group, or an acyl group.

Chemical formula B $$-(CH_2)_f-OR_5 \quad (B)$$

In the Chemical formula B, f represents an integer of from 2 to 20. $R_5$ is a hydrogen atom, an alkyl group, an acyl group, or an ether group having a dimethyl propyl backbone.

Chemical formula C $$-(CH_2)_g-(OC_2H_4)_h-(OC_3H_6)_i-(OC_4H_8)_j-(OCH_2CH(C_6H_5))_k-OR_6 \quad (C)$$

In the Chemical formula C, g represents an integer of from 2 to 6, h represents 0 or an integer of from 1 to 50, j represents 0 or an integer of from 1 to 10, and k represents 0 or an integer of from 1 to 10. $R_5$ is a hydrogen atom, an alkyl group, or an acyl group.

Specific examples of the product available on the market of the compound represented by the Chemical formula 1 include, but are not limited to, Tegotwin 4000 and Tegotwin 4100, manufactured by Evonik Industries AG.

Chemical formula 2

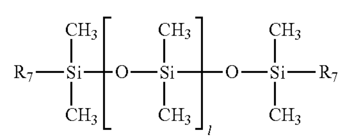

(2)

In the Chemical formula 2, 1 represents an integer of from 10 to 80. $R_7$ represents a substitution group represented by the Chemical formula D.

Chemical formula D $$-(CH_2)_m-(OC_2H_4)_n-(OC_3H_6)_o-R_8 \quad (D)$$

In the Chemical formula D, m represents an integer of from 1 to 6, n represents 0 or an integer of from 1 to 50, o represents 0 or an integer of from 1 to 50, and n+o is an integer of 1 or greater. $R_8$ represents a hydrogen atom or an alkyl group having one to six carbon atoms, or a (meth) acrylic group.

Specific examples of the product available on the market of the compound represented by Chemical formula 2 include, but are not limited to, BY16-201 and SF8427 (manufactured by Dow Corning Toray Co., Ltd.), BYK-333, BYK-333, and BYK-UV3500 (manufactured by BYK Japan KK.), and Tegoglide 410, Tegoglide 432, Tegoglide 435, Tegoglide 440, and Tegoglide 450 (all manufactured by Evonik Industries AG).

Chemical formula 3

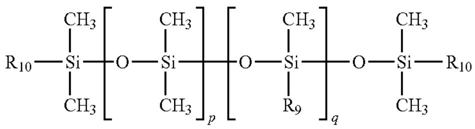

(3)

In the Chemical formula 3, p and q each, independently represent integers of 1 or greater and p+q are an integer of from 3 to 50. $R_9$ represents a substitution group represented by the following Chemical formula E and $R_{10}$ represents an alkyl group having one to six carbon atoms.

Chemical formula E $$-\!\!\left(CH_2\right)_r\!\left(OC_2H_4\right)_s\!\left(OC_3H_6\right)_t R_{11} \quad \text{(E)}$$

In the Chemical formula E, r represents an integer of from 1 to 6, s represents 0 or an integer of from 1 to 50, t represents 0 or an integer of from 1 to 50, and s+t is an integer of 1 or greater. $R_{11}$ represents a hydrogen atom or an alkyl group having one to six carbon atoms, or a (meth) acrylic group.

Specific examples of the product available on the market of the compound represented by the Chemical formula 3 include, but are not limited to, SF8428, FZ-2162, 8032 ADDITIVE, SH3749, FZ-77, L7001, L-7002, FZ-2104, FZ-2110, FZ-2123, SH8400, and SH3773M (all manufactured by Dow Corning Toray Co., Ltd.), BYK-345, BYK-346, BYK-347, BYK-348, and BYK-349 (all manufactured by BYK Japan KK.), Tegowet 250, Tegowet 260, Tegowet 270, and Tegowet 280 (all manufactured by Evonik Industries AG), and KF-351A, KF-352A, KF-353, KF-354L, KF-355A, KF-615A, KF-640, KF-642, and KF-643 (all manufactured by Shin-Etsu Chemical Co., Ltd.).

Polyurethane Resin Particle

Polyurethane resin particle can impart high gloss and abrasion resistance to an image.

The glass transition temperature (Tg) of the polyurethane resin particle is preferably 50 degrees C. or lower and more preferably 0 degrees C. or lower. When the glass transition temperature is 0 degrees C. or lower, fixing on a substrate such as a recording medium is more steady and adhesion and fixability are improved. Moreover, it is possible to suppress nozzle clogging when ink is discharged from a head. For this reason, the incidence rate of poor discharging can be reduced. In addition, ink film can be formed at the interface between liquid and air even when the drying ratio is low. Therefore, the ink film is not easily mixed with succeeding ink discharged onto the ink film, thereby preventing occurrence of color bleed.

As the polyurethane resin particle, for example, polyether-based polyurethane resin particles, polycarbonate-based polyurethane resin particles, and polyester-based polyurethane resin particles are preferable.

There is no specific limit to the polyurethane resin particle and it can be suitably selected to suit to a particular application. For example, polyurethane resin particle, etc. are suitably used which are obtained by reacting polyol with polyisocyanate.

Polyol

Examples of the polyol are polyether polyols, polycarbonate polyols, and polyester polyols. These can be used alone or in combination.

Polyether Polyol

As the polyether polyol, for example, articles can be used in which an alkyleneoxide is added by polymerization to a starting material, which is at least one kind of compounds having two or more active hydrogen atoms.

Specific examples of the compound including two or more active hydrogen atoms include, but are not limited to, ethylene glycol, diethylene glycol, triethylene glycol, propylene glycol, trimethylene glycol, 1,3-butanediol, 1,4-butanediol, 1,6-hexanediol, glycerin, trimethylol ethane, and trimethylol propane. These can be used alone or in combination.

In addition, specific examples of the alkylene oxide include, but are not limited to, ethylene oxide, propylene oxide, butylene oxide, styrene oxide, epichlorohydrine, and tetrahydrofuran. These can be used alone or in combination.

The polyether polyol has not particular limit and can be suitably selected to suit to a particular application. In order to obtain a binder for ink having extremely excellent abrasion resistance, it is preferable to use polyoxytetra methylene glycol or polyoxypropylene glycol. These can be used alone or in combination.

Polycarbonate Polyol

As polycarbonate polyol that can be used to manufacture the polyurethane resin particle, for example, a product obtained by reacting a carboxylic acid ester with a polyol or a phosgene with bisphenol A. These can be used alone or in combination.

Specific examples of carboxylic acid esters include, but are not limited to, methyl carbonate, dimethyl carbonate, ethyl carbonate, diethyl carbonate, cyclocarbonate, and diphenyl carbonate. These can be used alone or in combination.

Specific examples of the polyol include, but are not limited to, dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptane diol, 1,8-octane diol, 1,9-nonane diol, 1,10-decane diol, 1,11-undecane diol, 1,12-dodecane diol, 1,4-cyclohexanediol, 1,4-cyclohexane dimethanol, hydroquinone, resorcin, bisphenol A, bisphenol F, and 4,4'-biphenol, and polyether polyols such as polyethylene glycol, polypropylene glycol, and polyoxytetramethylene glycol, and polyester polyols such as polyhexanmethylene adipate, polyhexamethylene succinate, and polycaprolactone. These can be used alone or in combination.

Polyester Polyol

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a coploymerized polyester thereof. These can be used alone or in combination.

Specific examples of the polyol having a low molecular weight include, but are not limited to, ethylene glycol and propylene glycol. These can be used alone or in combination. Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof. These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethyl hexamethylene diisocyanate. These can be used alone or in combination. Of these, using an alicyclic diisocyanate is preferable in terms of extremely high level of weather resistance for a long period of time taking it into account that the ink of the present disclosure is expected to be applied to posters, signboards, etc., for outdoor use.

Furthermore, it is preferable to add at least one kind of alicyclic diisocyanate, thereby easily acquiring a desired film robustness and abrasion resistance.

Specific examples of the alicyclic diisocyanate include, but are not limited to, isophorone diisocyanate and dicyclohexylmethane diisocyanate.

The content ratio of the alicyclic diisocyanate is preferably 60 percent by mass or greater to the total content of the isocyanate compound.

When polyurethane resin particles are used in combination with the polysiloxane surfactant, color bleed can be prevented and high dispersibility is obtained. In addition, abrasion resistance of the film formed after recording is improved and chemical resistance is also improved.

Method of Manufacturing Polyurethane Resin Particle

The polyurethane resin particle can be manufactured by typical manufacturing methods. For example, the following method is suitable.

First, a urethane prepolymer having an isocyanate group at its distal end is prepared under the presence of no solvent or an organic solvent by the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if necessary to obtain the urethane resin particle.

Specific examples of the organic solvent for use in manufacturing the polyurethane resin particle include, but are not limited to, ketones such as acetone and methylethyl ketone; ethers such as tetrahydrofuran and dioxane, acetic acid esters such as ethyl acetate and butylacetate, nitriles such as acetonitrile, and amides such as dimethyl formamide, N-methyl pyrolidone, and N-ethyl pyrolidone. These can be used alone or in combination.

Polyamines or other compounds having an active hydrogen group are used as the chain elongating agent.

Specific examples of polyamine include, but are not limited to, diamines such as ethylene diamine, 1,2-propane diamine, 1,6-, piperazine, 2,5-dimethyl piperazine, isphoronediamine, 4,4'-dicyclohexyl methane diamine, and 1,4-cyclohexane diamine, polyamines such as diethylenetriamine, dipropylene triamine, and triethylene tetramine, hydrazines such as N,N'dimethyl hydrazine and 1,6-hexamethylene bis hydrazine, and dihydrazides such as succinic dihydrazide, adipic acid dihydrazide, glutaric acid dihydrazide, sebacic acid dihydrazide, and isophthalic acid dihydrazide. These can be used alone or in combination.

Specific examples of the compounds having active hydrogen groups include, but are not limited to, glycols such as ethylene glycol, diethylene glycol, triethylene glycol, propylene glycol, 1,3-propane diol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination unless degrading the storage stability of an ink.

As the polyurethane resin particle, polycarbonate-based polyurethane resin particles are preferable in terms of water resistance, heat resistance, abrasion resistance, wear resistance, and friction resistance of images due to high agglomeration power of carbonate groups. In the case of polycarbonate-based polyurethane resin particle, obtained ink is suitable for printed matter for use in severe conditions like outdoor use.

As the polyurethane resin particle, products available on the market can be used.

Specific examples include, but are not limited to, UCOAT UX-485 (polycarbonate-based polyurethane resin particles), UCOAT UWS-145 (polyester-based polyurethane resin particles), PERMARIN US-368T (polycarbonate-based polyurethane resin particles), and PERMARIN UA-200 (polyether-based polyurethane resin particles) (all manufactured by Sanyo Chemical Industries, Ltd.). These can be used alone or in combination.

Water

There is no specific limitation to the water and it can be suitably selected to suit to a particular application. For example, deionized water, ultrafiltered water, reverse osmosis water, pure water such as distilled water, and ultra pure water are suitable.

These can be used alone or in combination.

The proportion of the water to the entire ink is preferably from 15 to 60 percent by mass and more preferably 20 to 40 percent by mass. When the proportion is 15 percent by mass or more, excessive increase of viscosity can be prevented and discharging stability can be improved. When the proportion is 60 percent by mass or less, wettability to a non-permeable recording medium is suitable, which leads to improvement on the image quality.

Other Components

As the other components, examples are coloring materials, surfactants other than polysiloxane surfactants, preservatives and fungicides, corrosion inhibitors, pH regulators, and transparent anti-aging agents for rubber and plastic such as hindered phenol and hindered phenol amine.

Coloring Material

ISO-2469 (JIS-8148) can be used as the criteria of the whiteness of white ink. In general, a material having a value of 70 or greater can be used as a white material.

Specific examples of metal oxide for use in white ink include, but are not limited to, titanium oxide, iron oxide, tin oxide, zirconium oxide, and iron titanate (complex oxide of iron and titanium).

For example, color ink, black ink, gray ink, and metallic ink can be the non-white ink. The clear ink means ink mainly including a resin particle, an organic solvent, and water without a colorant.

Specific examples of the color ink include, but are not limited to, cyan ink, magenta ink, yellow ink, light cyan ink, light magenta ink, red ink, green ink, blue ink, orange ink, and violet ink.

The ink set of the present disclosure may include white ink and non-white ink such as color ink, black ink, gray ink, and metallic ink.

There is no specific limitation to the coloring material for use in the non-white ink as long as it shows non-white color. It can be suitably selected to suit to a particular application. For example, dyes and pigments are suitable. These can be used alone or in combination. Of these, pigments are preferable.

There is no specific limitation to the coloring material for use in the non-white ink and it can be suitably selected to suit to a particular application. For example, dyes and pigments are suitable. Of these, pigments are preferable.

Examples of the pigment are organic pigments and inorganic pigments.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used. These can be used alone or in combination.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (e.g., basic dye type chelates, acid dye type chelates), nitro pigments, nitroso pigments, and aniline black can be used. These can be used alone or in combination.

Also, hollow resin particles and hollow inorganic particles can be used.

Of those pigments, pigments having good affinity with solvents are preferable.

Specific examples of the pigment for black include, but are not limited to, carbon black (C.I. Pigment Black 7) such as furnace black, lamp black, acetylene black, and channel black, metals such as copper and iron (C.I. Pigment Black 11), and organic pigments such as aniline black (C.I Pigment Black 1). These can be used alone or in combination.

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. These can be used alone or in combination.

Examples of the coloring material for use in metallic ink are fine powder prepared by fine pulmerization of metal, alloyed metal, or a metal compound.

Specific examples include, but are not limited to, fine powders obtained by finely-pulverizing metal selected from the group consisting of aluminum, silver, gold, nickel, chrome, tin, zinc, indium, titanium, silicon, copper, and platinum or alloyed metal thereof or an oxide, a nitride, or a sulfide, or a carbide of the metal and alloyed metal, and any combination thereof.

To disperse a pigment in ink, for example, a hydrophilic functional group is introduced into the pigment to prepare a self-dispersible pigment, the surface of the pigment is coated with a resin, or a dispersant is used.

To introduce a hydrophilic group into a pigment, for example, a functional group such as a sulfone group and a carboxyl group is added to a pigment (e.g., carbon) to make it dispersible in water.

To coat the surface of a pigment with a resin, the pigment is encapsulated into microcapsules to make the pigment dispersible in water. This can be referred to as a resin-coated pigment. In this case, all the pigments to be added to ink are not necessarily entirely coated with a resin. Pigments partially or wholly uncovered with a resin may be dispersed in the ink unless such pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

A coloring material may be mixed with materials such as water and an organic solvent to obtain an ink. It is also possible to mix a pigment with water, a dispersant, etc., first to prepare a pigment dispersion and thereafter mix the pigment dispersion with materials such as water and an organic solvent to manufacture an ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably 0.1 to 50 percent by mass and more preferably 0.1 to 30 percent by mass.

It is preferable that the pigment dispersion be filtered with a filter, a centrifuge, etc. to remove coarse particles and thereafter degassed.

The number average particle diameter of the pigment has no particular limit and can be suitably selected to suit to a particular application. For example, the pigment preferably has a maximum frequency between 20 to 150 nm in the maximum number conversion. When the number average particle diameter is 20 nm or greater, dispersion and classification operations become easy.

When the particle diameter is 150 nm or less, the dispersion stability of pigment as the ink tends to be improved and in addition, discharging stability tends to become excellent, thereby ameliorating the image quality such as image density.

The number average particle diameter can be measured by using a particle size analyzer (Microtrac MODEL UPA 9340, manufactured by Nikkiso Co., Ltd.).

The proportion of the coloring material is preferably from 0.1 to 15 percent by mass and more preferably 1 to 10 percent by mass to the total content of the ink in terms of image density, fixability, and discharging stability.

Organic Solvent

The white ink in the present disclosure contains a solvent as a necessary ingredient, which is a water-soluble organic solvent having a boiling point of from 100 to 180 degrees C.

The proportion of the water-soluble organic solvent having a boiling point of from 100 to 180 degrees C. is preferably from 5 to 25 percent by mass. It is more preferably from 8 to 20 percent by mass and furthermore preferably from 10 to 15 percent by mass.

In addition, the ink in the ink set for use in the print method of the present disclosure includes no organic solvent having a boiling point of 280 degrees C. or higher under 1 atmospheric pressure. In the present disclosure, the inclusion means a proportion of 0.3 percent or greater, which apparently has an impact on the evaporation speed.

Each ink in the ink set includes no organic solvent having a boiling point of 280 degrees C. or higher under 1 atmospheric pressure so that both of the white ink and the non-white ink can be dried sooner.

The water-soluble organic solvent having a boiling point of from 100 to 180 degrees C. has no particular limitation as long as it is a water-soluble organic solvent.

Specific examples of the water-soluble organic solvent having a boiling point of from 100 to 180 degrees C. include, but are not limited to, ethylene glycol monomethylether, ethylene glycol monoethylether, ethylene glycol monopropylether, ethylene glycol monobutylether, propylene glycol monomethyl ether, propylene glycol monoethyl ether, propylene glycol monopropylether, methoxybutanol, 3-methyl-3-methoxybutanol, diethylene glycol dimethylether, diethylene glycol methylethylether, diethylene glycol methylether acetate, and ethyl lactate. Of these, propylene glycol monomethylether, propyleneblycol monoethylether, propyleneglycol monopropylether, methoxybutanol, and 3-methyl-3-methoxy butanol are preferable in terms of drying property and print quality. Water-soluble organic solvents having a methoxy group with a boiling point of from 100 to 180 degrees C. are particularly preferable.

More preferred are propylene glycol monomethylether, methoxybutanol, 3-methyl-3-methoxybutanol. Furthermore preferred are propylene glycol monomethylether and methoxybutanol. Most preferable is propylene glycol monomethylether.

Also, the ink may contain an organic solvent having a boiling point of from 200 to lower than 280 degrees C.

Specific examples include, but are not limited to, 1,2-pentanediol, 1,2-hexanediol, 1,2-octane diol, ethylene glycol monohexylether, ethylene glycol-2-ethylhexyl ether, diethylene glycol monombutyl ether, diethylene glycol monomhexylether, diethylene glycol-2-ethylhexylether, tirethylene glycol mononbutyl ether, dipropylene glycol monopropyl ether, dipropylene glycol monombutylether, tirpropylene glycol monomethyl ether, tripropylene glycol monobutyl ether, diethylene glycol methylbutylether, tirethylene glycol methylbutyl ether, and tipropylene glycol dimethyleher. Of these, alkane diol-based solvents or glycolether-based solvents having three or more carbon atoms in the carbon chain at distal end are preferable. Alkane diol-based solvents are more preferable and 1,2-hexanediol is furthermore preferable.

Specific examples of the water-soluble organic solvent include, but are not limited to, polyols such as ethylene glycol, diethylene glycol, 1,2-propane diol, 1,3-propane diol, 1,2-butanediol, 1,3-butanediol, 2,3-butanediol, 3-methyl-1,3-butanediol, triethylene glycol, polyethylene glycol, polypropylene glycol, 1,5-pentanediol, 1,6-hexanediol, and 2-ethyl-1,3-hexanediol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

In addition, it is possible to contain nitrogen-containing heterocyclic compounds such as 2-pyrolidone, N-methyl-2-pyrolidone, N-hydroxyethyl-2-pyrolidone, 1,3-dimethylimidazoline, ε-caprolactam, and γ-butylolactone, formamide, N-methyl formamide, N,N-dimethyl formamide, monoethanol amine, diethanol amine, and triethanol amine. Sulfur-containing compounds such as dimethyl sulfoxide, sulfolane, and thiodiethanol, propylene carbonate, and ethylene carbonate may be added.

Of these, in terms of accelerating film-forming of a resin and preventing agglomeration of particles as alcohol, 1,2-propane diol, 1,3-propane diol, 1,2-butanediol, 1,3-butanediol, and 2,3-propane diol are particularly preferable to obtain excellent image gloss.

Proportion of the water-soluble organic solvent in the entire ink is preferably from to 70 percent by mass and more preferably from 30 to 60 percent by mass.

β-Alkoxy Propionamide

It is possible to use suitably synthesized articles or products available on the market as the amide compound represented by the Chemical formula I.

The amide compound (β-methoxy-N,N-dimethyl propionamide) represented by the Chemical formula I can be synthesized as follows.

198.0 g (2 mol) of N,N-dimethyl acrylamide and 96 g (3 mol) of methanol are charged in a three-neck flask (500 ml) equipped with a stirrer, a thermocouples, and a nitrogen gas introduction tube.

Nitrogen gas is introduced and 20 mL of methanol solution containing 1.08 g (0.02 mol) of sodium methoxide at room temperature is added to the flask while being stirred. The temperature of the solution gradually rises and reaches 38 degrees C. as the reaction temperature in 30 minutes after the initialization of the reaction. The reaction temperature is controlled to be within the range of from 30 to 40 degrees C. using water bath. Heat generation of the reaction liquid ceases after five hours and is neutralized by acetic acid. After distilling away non-reacted material, a distillated product is obtained at 133 Pa and 58 degrees C. According to the analysis result of nuclear magnetic resonance (NMR) spectrum (1H-NMR and 13C-NMR), the thus-obtained product is determined as β-methoxy-N,N-dimethyl propionamide and the yield is 199 g (yield constant: 76 percent). According to the synthesis method described above, the amide compound represented by the Chemical formula I can be synthesized.

Examples of the product available on the market are Equamide™ M-100 and B-100 (manufactured by Idemitsu Kosan Co., Ltd.).

While β-alkoxypropionamides maintains solution power of typical amid-based solvents, it has a high boiling point and a power to dissolve paraffin. Therefore, β-alkoxypropionamides can be widely used as excellent cleaning agent and solvent. Also, it can make ink having excellent fixability on non-permeable recording medium such as paraffin. Since β-alkoxypropionamides has β-alkoxy group, moisture-retaining property is obtained to some degree. In addition, although β-alkoxypropionamides has a relatively high boiling point in comparison with other amine-based solvents, it has a low vapor pressure and is easily dried.

Proportion of the solvent of β-alkoxypropionamides in ink is preferably from 1 to 50 percent by mass and more preferably from 2 to 40 percent by mass. When the proportion is less than 1 percent, viscosity of the ink is not reduced, thereby degrading discharging stability so that fixation of waste ink in the maintenance unit of an ink discharging device may become severe. Conversely, when the proportion surpasses 50 percent by mass, drying property of ink on recording medium tends to be inferior and the text quality on the recording medium may deteriorate.

Surfactant Other Than Polysiloxane Surfactant

The ink of the present disclosure may contain a surfactant other than the polysiloxane surfactant so as to secure wettability of the ink to a recording medium.

The surfactant other than the polysiloxane surfactant has no particular limit and can be suitably selected to suit to a particular application. For example, anionic surfactants, nonionic surfactants, and amphoteric surfactants are usable. These can be used alone or in combination. Of these, nonionic surfactants are preferred in terms of dispersion stability and image quality.

In addition, it is possible to add a fluorochemical surfactant and/or silicone-based surfactant depending on formulation.

Specific examples of the nonionic surfactants include, but are not limited to, polyoxyethylene alkyl phenylethers, polyoxyethylene alkylesters, polyoxyethylene alkylamines, polyoxyethylene alkylamides, polyoxyethylene propylene block polymers, sorbitan aliphatic acid esters, polyoxyethylene sorbitan aliphatic acid esters, and adducts of acetylene alcohol with ethylene oxides. These can be used alone or in combination.

Proportion of the surfactant other than the polysiloxane surfactant is preferably from 0.1 to 5 percent by mass. When the proportion is 0.1 percent by mass or greater, wettability on a non-permeable recording medium is secured, thereby improving image quality. When the proportion is 5 percent by mass or less, ink tends not to foam so that excellent discharging stability is achieved.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-one.

Corrosion Inhibitor

The corrosion inhibitor has not particular limitation. Examples are acid sulfites and sodium thiosulfates.

pH regulator

The pH regulator has no particular limit. It is preferable to adjust the pH to 7 or higher. Specific examples include, but are not limited to, amines such as diethanol amine and triethanol amine.

Method of Manufacturing Ink

The method of manufacturing ink includes, for example, mixing, stirring, and dispersing water, an organic solvent, a coloring material, and optional materials of urethane resin particle and polysiloxane surfactant. The stirring and dispersion are conducted by, for example, a sand mill, a homogenizer, a ball mill, a paint shaker, an ultrasonic dispersing device, a stirrer having a typical stirring wing, a magnetic stirrer, and a high speed dispersing device.

Water-dispersible urethane resin particle in which polyurethane resin particle is dispersed in water can be used as the urethane resin particle.

Properties of ink are not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOM SANGYO CO., LTD.). The measuring conditions are as follows:

Standard cone rotor (1°34'×R24)

Sample liquid amount: 1.2 mL

Number of rotations: 50 rotations per minute (rpm) degrees C.

Measuring time: three minutes

The surface tension of the ink is preferably 30 mN/m or less and more preferably 27 mN/m or less at 25 degrees C. in terms that the ink is suitably levelized on a recording medium and the drying time of the ink is shortened. When the surface tension is 18 mN/m or less, deforming property of the ink is not easily secured, thereby degrading discharging stability.

pH of the ink is preferably from 7 to 12 and more preferably from 8 to 11 in terms of prevention of corrosion of metal material in contact with liquid.

The ink of the present disclosure can be suitably used for inkjet recording.

The substrate is not limited to articles used as typical recording media. It is suitable to use building materials such as wall paper and floor material, cloth for apparel, textile, and leather. In addition, the configuration of the paths through which a substrate is conveyed can be arranged to use ceramics, glass, metal, etc. Next, recording media are described. The substrate is not limited thereto.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and absorbency and includes a material having myriad of hollow spaces inside but not open to the outside. To be more quantitative, the substrate has a water-absorption amount of 10 mL/$m^2$ or less from the start of the contact until 30 $msec^{1/2}$ later according to Bristow method.

For example, plastic films of polyvinyl chloride resin, polyethylene terephthalate (PET), polypropylene, polyethylene, and polycarbonate film are suitably used as the non-permeable substrate.

In addition, when white ink is applied to a recording medium before non-white ink for color recording, such colored recording medium can be colored in white to improve the coloring of the non-white ink.

For example, colored paper, the film, fabric, cloth, ceramics can be the colored recording media.

The non-permeable substrate in the present disclosure includes substrates referred to as non-water absorbing substrate and poorly-water absorbing substrate which absorb no or little water or are slow to absorb water.

Ink Container

Figure 2:
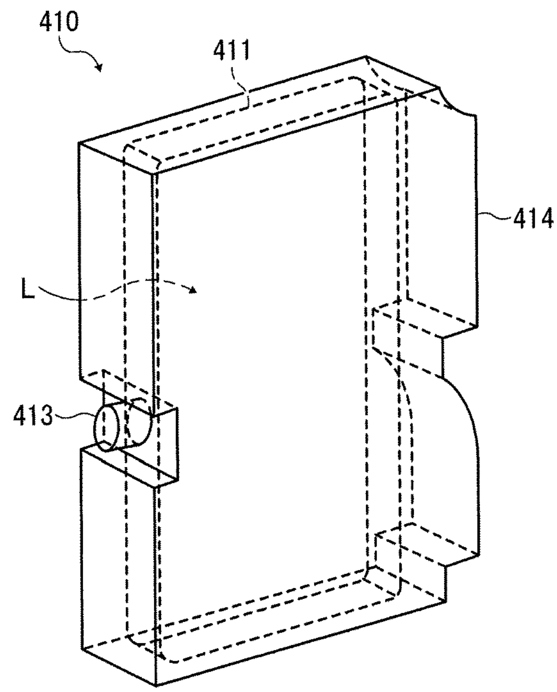
FIG. 2 is a diagram illustrating a perspective view of an example of the main tank of the apparatus illustrated in FIG. 1.

The ink of the present disclosure is accommodated in an ink container. FIG. 2 is a diagram illustrating an example of the ink container.

The ink container accommodates the ink and includes other optional suitably-selected members.

There is no specific limit to the ink container. It is possible to select any form, any structure, any size, and any material. For example, a container having at least an ink bag formed of aluminum laminate film, a resin film, etc. can be suitably used.

In the description, as examples of the print (recording) device and the print method for use in the present disclosure, recording media are used as the substrate. The present disclosure is not limited thereto.

Recording Device and Print Method

The ink of the present disclosure is applicable to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device, etc.).

In the present disclosure, the recording device and the print method respectively represent a device capable of discharging ink, various processing fluids, etc. to a recording medium and a method of conducting recording utilizing the device. The recording medium means an article to which ink or various processing fluids can be attached even temporarily.

The recording device may further optionally include a device relating to feeding, conveying, and ejecting the recording medium and other devices referred to as a preprocessing device, a post-processing device, etc. in addition to the head portion to discharge the ink.

The recording device and the print method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the print method are not limited to those producing meaningful visible images such as texts and figures with the ink. For example, the print method and the recording device can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll form as recording media.

The recording (print) device is described using an example with reference to FIG. 1 and FIG. 2. FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410*k*, 410*c*, 410*m*, and 410*y*) for each color of black (K), cyan (C), magenta (M), and yellow (Y) is made of a packaging member such as aluminum laminate film. The ink accommodating unit 411 is accommodated in, for example, a plastic container housing unit 414. As a result, the main tank 410 is used as an ink cartridge of each color.

A cartridge holder 404 is disposed on the rear side of the opening when a cover 401*c* is opened. The cartridge holder 404 is detachably attached to the main tank 410. As a result, each ink discharging outlet 413 of the main tank 410 communicates with a discharging head 434 for each color via a supplying tube 436 for each color so that the ink can be discharged from the discharging head 434 to a recording medium.

Heating Process and Heating Device

The heating process is to heat a recording medium having a recorded image thereon and can be conducted by a heater (heating device).

Quality images can be recorded on non-permeable recording media as the recording media by the inkjet print method. However, it is preferable to heat the non-permeable recording medium in order to achieve better abrasion resistance with better quality images, form images with better attachability to the recording media, and deal with high performance recording conditions. Due to the heating process conducted after recording, film forming of resin particles contained in ink is promoted so that image hardness of printed matter can be enhanced.

High heating temperatures are preferable in terms of drying property and film-forming temperatures. Specifically, when the heating temperature is in the range of from 40 to 120 degrees C., damage ascribable to the heat of the non-permeable recording medium can be prevented. Also, since the ink head is warmed, non-discharging of the ink is avoided. It is more preferably from 40 to 100 degrees C. and particularly preferably from 50 to 90 degrees C. in terms of drying property and film-forming temperature.

Figure 3:
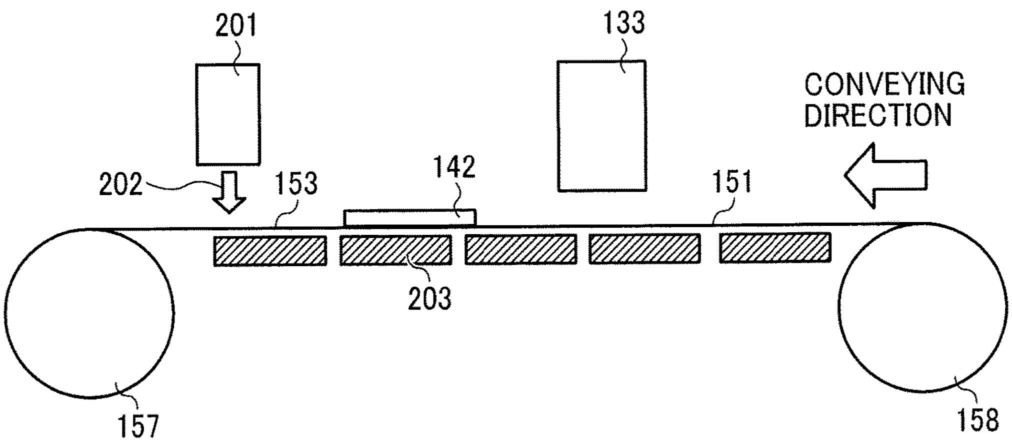
FIG. 3 is a schematic diagram illustrating an example of the heating device illustrated in FIG. 1.

FIG. 3 is a schematic diagram illustrating an example of the heating device to heat a recording medium. As illustrated in FIG. 3, due to driving of a recording head in response to image signals while moving a carriage 133, ink droplets are discharged onto a recording medium 142 to form an image thereon. A conveyor belt 151 is stretched between a conveying roller 157 and a tension roller 158. The recording medium 142 is conveyed on the conveyor belt 151. A fan heater 201 serving as a heat generating unit disposed above the guiding member 153 of the recording medium 142 blows a heated wind 202 to the image formed on the recording medium 142.

On the reverse side (on which the recording medium 142 is not placed) of the conveyor belt 151, a group of heaters 203 are disposed to provide heat to the recording medium 142 having an image thereon. A platen can be the group of heaters 203 and heated.

The inkjet print method of the present disclosure may include, for example, applying ink (white ink) containing a white pigment as a coloring material and recording using ink (non-white ink) containing a colored coloring material.

In this example, the white ink can be partially or entirely applied to the surface of a substrate. When partially applied to a recording medium, for example, it is possible to partially or entirely apply the white ink to the same portion as for recording.

When using the white ink, it is possible to use the following print method. The white ink is applied to a recording medium and colored ink other than white is applied onto the white ink. According to this, for example, if a transparent film is used, the white ink is attached to the surface of the recording medium, visibility of recording is secured. The ink of the present disclosure has also good drying property, high level of gloss, and strong abrasion resistance on a non-permeable recording medium, so that it is possible to coat the surface of a non-permeable substrate such as transparent film with the white ink to enhance visibility.

In addition, after recording on a transparent film, white ink can be applied thereon to obtain an image with such excellent visibility.

The ink of the present disclosure is applicable not only to inkjet print methods but also to other methods.

Specific examples of such other methods include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, a die coating method, and spray coating method.

For example, as an example of embodiments, in the case of applying the white ink to the entire surface of a recording medium, an applying method other than the inkjet print method is utilized, and if color ink other than white ink is used for recording, the inkjet print method is employed.

In another embodiment, the inkjet print method is employed for recording using white ink and color ink other than the white ink.

It is also possible to use clear ink instead of white ink.

Printed Matter

The printed matter includes a print layer formed on a substrate such as a recording medium using the ink set of the present disclosure.

For example, the inkjet recording device and the inkjet print method are utilized to record images to obtain the printed matter.

Image forming, recording, printing, etc. in the present disclosure represent the same meaning.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present invention is described in detail with reference to Examples but not limited to the following Examples.

Preparation Example 1 of Pigment Dispersion

Preparation of Black Pigment Dispersion

After preliminarily mixing the following recipe, the mixture was subject to circulation dispersion for seven hours with a disk type bead mill (KDL type, media: zirconia ball having a diameter of 0.3 mm, manufactured by SHINMARU ENTERPRISES CORPORATION) to obtain a black pigment dispersion (concentration of pigment solid portion: 15 percent by mass).

| | |
|---|---|
| Carbon black pigment (Product: Monarch 800, manufactured by Cabot Corporation): | 15 parts |
| Anionic surfactant (Product: Pionine A-51-B, manufactured by TAKEMOTO OIL & FAT Co., Ltd.): | 2 parts |
| Deionized water: | 83 parts |

Preparation Example 2 of Pigment Dispersion

Preparation of Cyan Pigment Dispersion

A cyan pigment dispersion (concentration of pigment solid portion: 15 percent by mass) was obtained in the same manner as Preparation Example 1 of Pigment Dispersion except that the carbon black pigment was changed to Pigment Blue 15:3 (Product: LIONOL BLUE FG-7351, manufactured by TOYO INK CO., LTD.).

Preparation Example 3 of Pigment Dispersion

Preparation of Magenta Pigment Dispersion

A magenta pigment dispersion (concentration of pigment solid portion: 15 percent by mass) was obtained in the same manner as Preparation Example 1 of Pigment Dispersion except that the carbon black pigment was changed to Pigment Red 122 (Product: TONER MAGENTA E002, manufactured by Clariant Japan K.K.).

Preparation Example 4 of Pigment Dispersion

Preparation of Yellow Pigment Dispersion 1

A yellow pigment dispersion 1 (concentration of pigment solid portion: 15 percent by mass) was obtained in the same manner as Preparation Example 1 of Pigment Dispersion except that the carbon black pigment was changed to Pigment Yellow 155 (Product: TONER YELLOW 3GP, manufactured by Clariant Japan K.K.).

Preparation Example 5 of Pigment Dispersion

Preparation of White Pigment Dispersion 1

25 parts of titanium oxide (Product: STR-100W, manufactured by Sakai Chemical Industry Co., Ltd.), 5 parts of a pigment dispersant (Product: TEGO Dispers 651, manufactured by Evonik Japan Co., Ltd.), and 70 parts of water were mixed followed by dispersion for five minutes using a bead mill (Product: Research Labo, manufactured by Shinmaru Enterprises Corporation) with 0.3 mm diameter zirconia beads and a filling ratio of 60 percent at 8 m/s to obtain a white pigment dispersion (concentration of pigment solid portion: 25 parts by mass).

Preparation Example 6 of Pigment Dispersion

Preparation of White Pigment Dispersion 2 and Inorganic Hollow Pigment Dispersion 10.0 g of DISPERBYK-2008 (acrylic copolymer, effective component: 60 percent, manufactured by BYK was dissolved in 294.0 g of highly pure water. While stirring the solution at 5,000 rotation per minute (rpm) for 30 minutes by EXCEL AUTO HOMOGENIZER (manufactured by NISSEI Corporation), 50.0 g of inorganic hollow particle (SiliNax™, average primary particle diameter: 80 to 130 nm, silica film thickness: 5 to 15 nm, manufactured by Nittetsu Mining Co., Ltd.) divided into ten was admixed. After dispersed until the resultant had no block, the rotation speed was gradually increased and the resultant was stirred at 10,000 rpm for 30 minutes.

While being cooled down with water, the liquid dispersion of pigment was treated by Homogenizer (US-300T, tip diameter: 26, manufactured by NISSEI Corporation) at 200 μA for one hour followed by filtration with a membrane filter (cellulose acetate film) of 5 μm to obtain inorganic hollow particle dispersion in which the inorganic hollow particle accounted for 14.1 percent by mass).

The product names and manufactures of the components for use in Examples and Comparative Examples are as shown in Table 1. Regarding the resin particle, concentration of resin solid portion is shown.

TABLE 1

| | Product name | Manufacturer | Composition | Tg or bp | Concentration of solid portion |
|---|---|---|---|---|---|
| Resin Particle | SUPERFLEX ® 150 | DKS Co. Ltd. | Polyester/ether-based urethane resin emulsion | Tg: 40 degrees C. | 30 percent by mass |
| | SUPERFLEX ® 170 | DKS Co. Ltd. | Polyester•ether-based urethane resin emulsion | Tg: 75 degrees C. | 33 percent by mass |
| | SUPERFLEX ® 210 | DKS Co. Ltd. | Polyester-based urethane resin emulsion | Tg: 41 degrees C. | 35 percent by mass |
| | SUPERFLEX ® 300 | DKS Co. Ltd. | Polyester/ether-based urethane resin emulsion | Tg: −42 degrees C. | 30 percent by mass |
| | SUPERFLEX ® 470 | DKS Co. Ltd. | Polycarbonate-based urethane resin emulsion | Tg: −31 degrees C. | 38 percent by mass |
| | JONCRYL ® 585 | BASF | Styrene-acrylic-based resin emulsion | Tg: −20 degrees C. | 43 percent by mass |
| | AE980 | EMULSION TECHNOLOGY CO., LTD. | Acrylic-silicone resin emulsion | Tg: −14 degrees C. | 50 percent by mass |
| Organic solvent | PG | — | Propylene glycol | bp: 188 degrees C. | — |
| | 1,2-HD | — | 1,2-Hexane diol | bp: 223-224 degrees C. | — |
| | 2-P | — | 2-pyrrolidone | bp: 245 degrees C. | — |
| | MMB | — | 3-methoxy-3-methylbutanol | bp: 173-175 degrees C. | — |
| | MB | — | 3-methoxybutanol | bp: 161 degrees C. | — |
| | PGnPE | — | Propylene glycol-n-propylether | bp: 149 degrees C. | — |
| | PGmME | — | Propylene glycol monomethyl ether | bp: 120 degrees C. | — |
| | Glycerin | — | Propane-1,2,3-triol | bp: 290 degrees C. | — |
| | MEDG | — | Diethylene glycol ethylmethyl ether | bp: 179 degrees C. | — |
| | Equamide ™ M100 | Idemitsu Kosan Co., Ltd. | Compound represented by Chemical formula I, (R1: methyl group, R2: methyl group, R3: methyl group) | bp: 216 degrees C. | — |

TABLE 1-continued

| | Product name | Manufacturer | Composition | Tg or bp | Concentration of solid portion |
|---|---|---|---|---|---|
| | Equamide ™ B100 | Idemitsu Kosan Co., Ltd. | Compound represented by Chemical formula I, (R1: butyl group, R2: methyl group, R3: methyl group) | bp: 252 degrees C. | — |
| Surfactant | BYK-348 | BYK Japan KK | Compound represented by Chemical formula 2 | — | — |

Below is a manufacturing example of ink including a water-soluble organic solvent having a boiling point of from 100 to 180 degrees C. as white ink. Examples I-1 to I-19, Comparative Example I-1 to I-6, and Reference Examples I-1 to I-6

White inks WI-1 to WI-15 were manufactured based on the prescriptions shown in Table I-1.

Non-white inks I-K1, I-C1, I-M1, and I-Y1 were manufactured based on the prescriptions shown in Table I-2.

Images were formed under the following conditions using inks of Examples I-1 to I-19, Comparative Examples I-1 to I-6, and Reference Examples I-1 to I-6.

Forming of Solid Image

Ink cartridges filled with the white ink and the non-white ink were mounted onto an inkjet printer (RICOH Pro L4160, manufactured by Ricoh Company Ltd.) and the white ink was applied first to non-porous substrate (transparent polyethylene terephthalate (PET) sheet, LLPET 1223, manufactured by SAKURAI CO., LTD.) and a non-white images were formed thereon to obtain printed matter of solid image with the white ink applied first.

The white ink shown in Table 1 was discharged to the PET film (first recording process), the white ink was dried until the drying ratio of the white ink reached a predetermined value (drying process), and thereafter the non-white ink was discharged onto the white ink in a band-like manner (second recording process) to form a solid image of an evaluation chart as printed matter.

The heating temperatures of Table I-3 to I-8 indicate the temperatures of the recording media on which the ink lands.

How to Obtain Drying Ratio

The drying ratio of the white ink is obtained as follows.

1. Heating Recording Medium

Transparent PET sheet (LLPET 1223, manufactured by SAKURAI CO., LTD.) of non-porous substrate cut to reed-like form of 15 cm long×8 cm wide was attached to a hot plate (NINOS ND-2, manufactured by AS ONE Corporation) to heat the recording medium until the temperature thereof reached the heating temperature T (shown in Tables I-3 to I-8). The temperature unevenness of the surface of the recording medium is within −2 to +2 degrees C. The surface temperature of the recording medium was measured at the center thereof using a radiation thermometer (FT-H20, manufactured by KEYENCE CORPORATION).

2. Manufacturing of Printed Matter Using Bar Coater

Ink was applied to the recording medium by a bar coater to form printed matter in such a manner that the difference of ink application amount per unit of area after drying between printed matter obtained by inkjet printing and printed matter obtained by the bar coater was 3 percent by mass.

3. Figure Out Relation Among Heating Temperature, Drying Time, and Drying Ratio

Mass change of the printed matter formed by application by the bar coater as described above was measured at the heating temperature T of the PET film set as the temperatures shown in Tables I-3 to I-8 while changing the drying time. The drying time was defined as the time until when the recording medium was detached from the hot plate (NINOS ND-2, manufactured by AS ONE Corporation) and the time to be taken from the detachment until the recording medium was placed on electronic balance was 10 seconds. The mass was measured eight seconds after the recording medium was placed on the electronic balance. The heating temperature T was measured by contacting the temperature sensor with the recording medium.

According to such an experiment, a graph indicating the drying time and the mass change at the heating temperature T can be created. The drying time can be calculated by the mass change. That is, the drying ratio is calculated based on a state of no drying, meaning a drying ratio of 0 percent, and a state in which no mass decrease occurs at further drying (heating), meaning a drying ratio of 100 percent. As a result, a graph indicating the relation between the drying time and the drying ratio can be obtained.

As for the heating temperature T shown in Tables I-3 to I-8, the drying time required to achieve the drying ratio X shown in Tables I-3 to I-8 is defined as the drying time t1.

4. Print Utilizing Inkjet Printer Using an inkjet printer (RICOH Pro L4160, manufactured by RICOH Company Ltd.), the heater temperature (platen temperature) was set to obtain the temperatures shown in Tables I-3 to I-8. Furthermore, the time interval between when the white ink was discharged by the recording head as the first print process and when the non-white ink was printed on the white ink by the recording head as the second print process was set to be the drying time t1. That is, the recording head for use in the first print process was set to have a waiting time after the white ink was printed by the recording head and the time to be taken for the drying process was set to be t1.

The white ink was discharged in the first print process and subject to the drying process for the drying time t1 until the second print process started. Thereafter, the non-white ink was overlapped on the white ink to form printed matter. The thus-obtained printed matter was obtained by the print method of the present disclosure in which the non-white ink was overlapped on the white ink at the recording medium temperature T with a drying ratio of X percent.

The processes of 1 to 4 described above were conducted at an environment temperature of 25 degrees C. and a humidity of 50 percent RH.

Image Bleed

The evaluation results are shown in Tables I-3 to I-8.

Evaluation on Image Bleed

The solid image printed on the evaluation chart was observed to evaluate the degree of occurrence of bleeding.

The evaluation was made by 6 level scaling. Of the six levels, AA, A, and B are allowable in light of practical use.

Evaluation Criteria

AA: No image bleed occurs on all the band-like patterns

A: No image bleed was visually confirmed for all the band-like patterns but slight image bleed was confirmed with magnifying glass B: Slight image bleed was visually confirmed C: Slight image bleed was visually confirmed at the border of the band-ink patterns D: Image bleed was visually confirmed at the border of the band-ink patterns

TABLE I-1

| | | | Note | WI-1 | WI-2 | WI-3 | WI-4 | WI-5 |
|---|---|---|---|---|---|---|---|---|
| Coloring material | White coloring material | Titanium Oxide | White pigment dispersion 1 (pigment) | 8 percent | | 0 percent | 8 percent | 8 percent |
| | | Hollow particle | White pigment dispersion 2 (pigment) | | 8 percent | 0 percent | | |
| Organic solvent | | PG | bp: 188 degrees C. | 15 percent | 15 percent | 15 percent | 15 percent | 15 percent |
| | | 1,2-HD | bp: 223 to 224 degrees C. | 5 percent | 5 percent | 5 percent | 5 percent | 5 percent |
| | | Glycerin | bp: 290 degrees C. | | | | | |
| | | MMB | bp: 173 to 175 degrees C. | 3 percent | 3 percent | 3 percent | | |
| | | MB | bp: 161 degrees C. | | | | 3 percent | |
| | | PGnPE | bp: 149 degrees C. | | | | | 3 percent |
| | | PGmME | bp: 120 degrees C. | | | | | |
| | | MEDG | bp: 179 degrees C. | | | | | |
| Resin | Urethane resin particle | SUPERFLEX ® 470 | Tg: −31 degrees C. | 3 percent | 3 percent | 3 percent | 3 percent | 3 percent |
| | | SUPERFLEX ® 300 | Tg: −42 degrees C. | | | | | |
| | | SUPERFLEX ® 210 | Tg: 41 degrees C. | | | | | |
| | | SUPERFLEX ® 170 | Tg: 75 degrees C. | | | | | |
| | | SUPERFLEX ® 150 | Tg: 40 degrees C. | | | | | |
| | Water-soluble urethane resin | JONCRYL ® 585 | Tg: −20 degrees C. | | | | | |
| | Acrylic silicone resin particle | AE980 | Tg: −14 degrees C. | | | | | |
| Surfactant | | BYK-348 | Chemical formula 2, manufactured by BYK Japan KK | 0.5 percent | 0.5 percent | 0.5 percent | 0.5 percent | 0.5 percent |
| | | Water (rest) | | 65.5 percent | 65.5 percent | 73.5 percent | 65.5 percent | 65.5 percent |

| | | | Note | WI-6 | WI-7 | WI-8 | WI-9 | WI-10 |
|---|---|---|---|---|---|---|---|---|
| Coloring material | White coloring material | Titanium Oxide | White pigment dispersion 1 (pigment) | 8 percent | 8 percent | 8 percent | 8 percent | 8 percent |
| | | Hollow particle | White pigment dispersion 2 (pigment) | | | | | |
| Organic solvent | | PG | Bp: 188 degrees C. | 15 percent | 18 percent | 12 percent | 15 percent | 15 percent |
| | | 1,2-HD | bp: 223 to 224 | 5 percent | 5 percent | 2 percent | 5 percent | 5 percent |

TABLE I-1-continued

| | | | | | | | | |
|---|---|---|---|---|---|---|---|---|
| | | | degrees C. | | | | | |
| | | Glycerin | bp: 290 degrees C. | | | 3 percent | | |
| | | MMB | bp: 173 to 175 degrees C. | | | 3 percent | 3 percent | 3 percent |
| | | MB | bp: 161 degrees C. | | | | | |
| | | PGnPE | bp: 149 degrees C. | | | | | |
| | | PGmME | bp: 120 degrees C. | | | | | |
| | | MEDG | bp: 179 degrees C. | 3 percent | | | | |
| Resin | Urethane resin particle | SUPERFLEX ® 470 | Tg: −31 degrees C. | 3 percent | 3 percent | 3 percent | | |
| | | SUPERFLEX ® 300 | Tg: −42 degrees C. | | | | 3 percent | |
| | | SUPERFLEX ® 210 | Tg: 41 degrees C. | | | | | 3 percent |
| | | SUPERFLEX ® 170 | Tg: 75 degrees C. | | | | | |
| | | SUPERFLEX ® 150 | Tg: 40 degrees C. | | | | | |
| | Water-soluble urethane resin | JONCRYL ® 585 | Tg: −20 degrees C. | | | | | |
| | Acrylic silicone resin particle | AE980 | Tg: −14 degrees C. | | | | | |
| Surfactant | | BYK-348 | Chemical formula 2, manufactured by BYK Japan KK | 0.5 percent | 0.5 percent | 0.5 percent | 0.5 percent | 0.5 percent |
| | | Water (rest) | | 65.5 percent | 65.5 percent | 68.5 percent | 65.5 percent | 65.5 percent |

| | | | Note | WI-11 | WI-12 | WI-13 | WI-14 | WI-15 |
|---|---|---|---|---|---|---|---|---|
| Coloring material | White coloring material | Titanium Oxide | White pigment dispersion 1 (pigment) | 8 percent | 8 percent | 8 percent | 8 percent | 8 percent |
| | | Hollow particle | White pigment dispersion 2 (pigment) | | | | | |
| Organic solvent | | PG | bp: 188 degrees C. | 15 percent | 15 percent | 15 percent | 15 percent | 15 percent |
| | | 1,2-HD | bp: 223 to 224 degrees C. | 5 percent | 5 percent | 5 percent | 5 percent | 5 percent |
| | | Glycerin | bp: 290 degrees C. | | | | | |
| | | MMB | bp: 173 to 175 degrees C. | 3 percent | 3 percent | 3 percent | 3 percent | |
| | | MB | bp: 161 degrees C. | | | | | |
| | | PGnPE | bp: 149 degrees C. | | | | | |
| | | PGmME | bp: 120 degrees C. | | | | | 3 percent |
| | | MEDG | bp: 179 degrees C. | | | | | |
| Resin | Urethane resin particle | SUPERFLEX ® 470 | Tg: −31 degrees C. | | | | | 3 percent |
| | | SUPERFLEX ® 300 | Tg: −42 degrees C. | | | | | |
| | | SUPERFLEX ® 210 | Tg: 41 degrees C. | | | | | |
| | | SUPERFLEX ® 170 | Tg: 75 degrees C. | 3 percent | | | | |
| | | SUPERFLEX ® 150 | Tg: 40 degrees C. | | 3 percent | | | |
| | Water-soluble | JONCRYL ® 585 | Tg: −20 degrees C. | | | 3 percent | | |

TABLE I-1-continued

| | | | | | | | | |
|---|---|---|---|---|---|---|---|---|
| | urethane resin | | | | | | | |
| | Acrylic silicone resin particle | AE980 | Tg: −14 degrees C. | | | | 3 percent | |
| Surfactant | | BYK-348 | Chemical formula 2, manufactured by BYK Japan KK | 0.5 percent | 0.5 percent | 0.5 percent | 0.5 percent | 05 percent |
| | | Water (rest) | | 65.5 percent | 65.5 percent | 65.5 percent | 65.5 percent | 65.5 percent |

TABLE I-2

| | | | Note | I-K1 | I-C1 | I-M1 | I-Y1 | I-OC |
|---|---|---|---|---|---|---|---|---|
| Coloring material | Non-white coloring material | Carbon Black | Black pigment dispersion (pigment) | 3 percent | | | | |
| | | Pigment Blue 15:3 | Cyan pigment dispersion (pigment) | | 3 percent | | | |
| | | Pigment Red 122 | Magenta pigment dispersion (pigment) | | | 3 percent | | |
| | | Pigment Yellow 155 | Yellow pigment dispersion (pigment) | | | | 3 percent | |
| Organic solvent | | PG | bp: 188 degrees C. | 15 percent | 15 percent | 15 percent | 15 percent | 15 percent |
| | | 1,2-HD | bp: 223 to 224 degrees C. | 5 percent | 5 percent | 5 percent | 5 percent | 5 percent |
| | | Glycerin | bp: 290 degrees C. | | | | | |
| | | MMB | bp: 173 to 175 degrees C. | 3 percent | 3 percent | 3 percent | 3 percent | 3 percent |
| | | MB | bp: 161 degrees C. | | | | | |
| | | PGnPE | bp: 149 degrees C. | | | | | |
| | | PGmME | bp: 120 degrees C. | | | | | |
| | | MEDG | bp: 179 degrees C. | | | | | |
| Resin | Urethane resin particle | SUPERFLEX ® 470 | Tg: −31 degrees C. | 3 percent | 3 percent | 3 percent | 3 percent | 6 percent |
| | | SUPERFLEX ® 300 | Tg: −42 degrees C. | | | | | |
| | | SUPERFLEX ® 210 | Tg: 41 degrees C. | | | | | |
| | | SUPERFLEX ® 170 | Tg: 75 degrees C. | | | | | |
| | | SUPERFLEX ® 150 | Tg: 40 degrees C. | | | | | |
| | Water-soluble urethane resin | JONCRYL ® 585 | Tg: −20 degrees C. | | | | | |
| | Acrylic silicone resin particle | AE980 | Tg: −14 degrees C. | | | | | |

TABLE I-2-continued

| | | | | | | | |
|---|---|---|---|---|---|---|---|
| Surfactant | BYK-348 | Compound represented by Chemical formula 2 | 0.5 percent | 0.5 percent | 0.5 percent | 0.5 percent | 0.5 percent |
| | Water (rest) | | 70.5 percent | 70.5 percent | 70.5 percent | 70.5 percent | 70.5 percent |

TABLE I-3

| | Example/Comparative Example No. | | | | | | | | | | | |
|---|---|---|---|---|---|---|---|---|---|---|---|---|
| | Example I-1 | | | | Example I-2 | | | | Comparative Example I-1 | | | |
| Ink set | 1 | | | | 2 | | | | 3 | | | |
| White ink or clear ink discharged first | WI-1 | | | | WI-2 | | | | WI-3 | | | |
| Non-white ink discharged after white ink | K1 | C1 | M1 | Y1 | K1 | C1 | M1 | Y1 | K1 | C1 | M1 | Y1 |
| Drying ratio X of ink discharged first | 20 percent | | | | 20 percent | | | | 20 percent | | | |
| Sequence of discharging | White ink to non-white ink | | | | White ink to non-white ink | | | | White ink to clear ink | | | |
| Heating temperature T | 55 degrees C. | | | | | | | | | | | |
| Bleed (rating) | A | A | A | A | A | A | A | A | C | C | C | C |
| Changing amount of L value (percent) | 0 | 0 | 0 | 0 | 3 | 3 | 3 | 3 | 5 | 5 | 5 | 5 |

TABLE I-4

| | Example/Comparative Example No. | | | | | | | | | | | |
|---|---|---|---|---|---|---|---|---|---|---|---|---|
| | Example I-1 | | | | Example I-3 | | | | Example I-4 | | | |
| Ink set | 1 | | | | 4 | | | | 5 | | | |
| White ink or clear ink discharged first | WI-1 | | | | WI-4 | | | | WI-5 | | | |
| Non-white ink discharged after white ink or clear ink | K1 | C1 | M1 | Y1 | K1 | C1 | M1 | Y1 | K1 | C1 | M1 | Y1 |
| Drying ratio X of ink discharged first | 20 percent | | | | 20 percent | | | | 20 percent | | | |
| Sequence of discharging | White ink to non-white ink | | | | White ink to non-white ink | | | | White ink to non-white ink | | | |
| Heating temperature T | 55 degrees C. | | | | | | | | | | | |
| Bleed (rating) | A | A | A | A | A | A | A | B | AA | AA | AA | A |

| | Example/Comparative Example No. | | | | | | | |
|---|---|---|---|---|---|---|---|---|
| | Example I-5 | | | | Example I-19 | | | |
| Ink set | 6 | | | | 15 | | | |
| White ink or clear ink discharged first | WI-6 | | | | WI-15 | | | |
| Non-white ink discharged after white ink or clear ink | K1 | C1 | M1 | Y1 | K1 | C1 | M1 | Y1 |
| Drying ratio X of ink discharged first | 20 percent | | | | 20 percent | | | |
| Sequence of discharging | White ink to non-white ink | | | | White ink to non-white ink | | | |
| Heating temperature T | 55 degrees C. | | | | | | | |
| Bleed (rating) | B | B | B | B | AA | AA | AA | AA |

TABLE I-5

| | Example/Comparative Example No. | | |
|---|---|---|---|
| | Example I-1 | Comparative Example I-2 | Comparative Example I-3 |
| Ink set | 1 | 7 | 8 |
| White ink or clear ink discharged first | WI-1 | WI-7 | WI-8 |

TABLE I-5-continued

| | | | | | | | | | | | | |
|---|---|---|---|---|---|---|---|---|---|---|---|---|
| Non-white ink discharged after white ink or clear ink | K1 | C1 | M1 | Y1 | K1 | C1 | M1 | Y1 | K1 | C1 | M1 | Y1 |
| Drying ratio X of ink discharged first | 20 percent | | | | 20 percent | | | | 20 percent | | | |
| Sequence of discharging | White ink to non-white ink | | | | White ink to non-white ink | | | | White ink to non-white ink | | | |
| Heating temperature T | 55 degrees C. | | | | | | | | | | | |
| Bleed (rating) | A | A | A | A | C | C | C | C | D | D | D | D |

TABLE I-6

| | Example/Comparative Example I No. | | | | | | | | | | | |
|---|---|---|---|---|---|---|---|---|---|---|---|---|
| | Example I-1 | | | | Example I-6 | | | | Example I-7 | | | |
| Ink set | 1 | | | | 9 | | | | 10 | | | |
| White ink or clear ink discharged first | WI-1 | | | | WI-9 | | | | WI-10 | | | |
| Non-white ink discharged after white ink | K1 | C1 | M1 | Y1 | K1 | C1 | M1 | Y1 | K1 | C1 | M1 | Y1 |
| Drying ratio X of ink discharged first | 20 percent | | | | 20 percent | | | | 20 percent | | | |
| Sequence of discharging | White ink to non-white ink | | | | White ink to non-white ink | | | | White ink to non-white ink | | | |
| Heating temperature T | 55 degrees C. | | | | | | | | | | | |
| Bleed (rating) | A | A | A | A | A | A | A | A | B | B | B | B |

| | Example/Comparative Example I No. | | | | | | | |
|---|---|---|---|---|---|---|---|---|
| | Example I-8 | | | | Example I-9 | | | |
| Ink set | 11 | | | | 12 | | | |
| White ink or clear ink discharged first | WI-11 | | | | WI-12 | | | |
| Non-white ink discharged after white ink or clear ink | K1 | C1 | M1 | Y1 | K1 | C1 | M1 | Y1 |
| Drying ratio X of ink discharged first | 20 percent | | | | 20 percent | | | |
| Sequence of discharging | White ink to non-white ink | | | | White ink to non-white ink | | | |
| Heating temperature T | 55 degrees C. | | | | | | | |
| Bleed (rating) | B | B | B | B | A | A | A | A |

| | Example/Comparative Example I No. | | | | | | | |
|---|---|---|---|---|---|---|---|---|
| | Example I-10 | | | | Comparative Example I-4 | | | |
| Ink set | 13 | | | | 14 | | | |
| White ink or clear ink discharged first | WI-13 | | | | WI-14 | | | |
| Non-white ink discharged after white ink or clear ink | K1 | C1 | M1 | Y1 | K1 | C1 | M1 | Y1 |
| Drying ratio X of ink discharged first | 20 percent | | | | 20 percent | | | |
| Sequence of discharging | White ink to non-white ink | | | | White ink to non-white ink | | | |
| Heating temperature T | 55 degrees C. | | | | | | | |
| Bleed (rating) | B | B | B | B | C | C | C | C |

TABLE I-7

| | Example/Comparative Example No. | | | | | | | | | | | |
|---|---|---|---|---|---|---|---|---|---|---|---|---|
| | Example I-1 | | | | Example I-10 | | | | Comparative Example I-5 | | | |
| Ink set | 1 | | | | 13 | | | | 14 | | | |
| White ink or clear ink discharged first | WI-1 | | | | WI-13 | | | | WI-14 | | | |
| Non-white ink discharged after white ink or clear ink | K1 | C1 | M1 | Y1 | K1 | C1 | M1 | Y1 | K1 | C1 | M1 | Y1 |
| Drying ratio X of ink discharged first | 20 percent | | | | 20 percent | | | | 20 percent | | | |
| Sequence of discharging | White ink to non- | | | | White ink to non- | | | | White ink to non- | | | |

TABLE I-7-continued

| | | | | | | | | | | | | |
|---|---|---|---|---|---|---|---|---|---|---|---|---|
| | white ink | | | | white ink | | | | white ink | | | |
| Heating temperature T | 55 degrees C. | | | | | | | | | | | |
| Bleed (rating) | A | A | A | A | B | B | B | B | C | C | C | C |

| | Example/Comparative Example No. | | | | | | | |
|---|---|---|---|---|---|---|---|---|
| | Example I-11 | | | | Example I-12 | | | |
| Ink set | 1 | | | | 13 | | | |
| White ink or clear ink discharged first | WI-1 | | | | WI-13 | | | |
| Non-white ink discharged after white ink or clear ink | K1 | C1 | M1 | Y1 | K1 | C1 | M1 | Y1 |
| Drying ratio X of ink discharged first | 30 percent | | | | 30 percent | | | |
| Sequence of discharging | White ink to non-white ink | | | | White ink to non-white ink | | | |
| Heating temperature T | 55 degrees C. | | | | | | | |
| Bleed (rating) | A | A | A | A | B | B | B | B |

| | Example/Comparative Example No. | | | | | | | |
|---|---|---|---|---|---|---|---|---|
| | Comparative Example I-6 | | | | Reference Example I-1 | | | |
| Ink set | 14 | | | | 1 | | | |
| White ink or clear ink discharged first | WI-14 | | | | WI-1 | | | |
| Non-white ink discharged after white ink or clear ink | K1 | C1 | M1 | Y1 | K1 | C1 | M1 | Y1 |
| Drying ratio X of ink discharged first | 30 percent | | | | 35 percent | | | |
| Sequence of discharging | White ink to non-white ink | | | | White ink to non-white ink | | | |
| Heating temperature T | 55 degrees C. | | | | | | | |
| Bleed (rating) | C | C | C | C | A | A | A | A |

| | Example/Comparative Example No. | | | | | | | | | | | |
|---|---|---|---|---|---|---|---|---|---|---|---|---|
| | Reference Example I-2 | | | | Reference Example I-3 | | | | Reference Example I-4 | | | |
| Ink set | 13 | | | | 14 | | | | 1 | | | |
| White ink or clear ink discharged first | WI-13 | | | | WI-14 | | | | WI-1 | | | |
| Non-white ink discharged after white ink or clear ink | K1 | C1 | M1 | Y1 | K1 | C1 | M1 | Y1 | K1 | C1 | M1 | Y1 |
| Drying ratio X of ink discharged first | 35 percent | | | | 35 percent | | | | 40 percent | | | |
| Sequence of discharging | White ink to non-white ink | | | | White ink to non-white ink | | | | White ink to non-white ink | | | |
| Heating temperature T | 55 degrees C. | | | | | | | | | | | |
| Bleed (rating) | B | B | B | B | B | B | B | B | A | A | A | A |

| | Example/Comparative Example No. | | | | | | | |
|---|---|---|---|---|---|---|---|---|
| | Reference Example I-5 | | | | Reference Example I-6 | | | |
| Ink set | 13 | | | | 14 | | | |
| White ink or clear ink discharged first | WI-13 | | | | WI-14 | | | |
| Non-white ink discharged after white ink or clear ink | K1 | C1 | M1 | Y1 | K1 | C1 | M1 | Y1 |
| Drying ratio X of ink discharged first | 40 percent | | | | 40 percent | | | |
| Sequence of discharging | White ink to non-white ink | | | | White ink to non-white ink | | | |
| Heating temperature T | 55 degrees C. | | | | | | | |
| Bleed (rating) | A | A | A | A | B | B | B | B |

TABLE I-8

| | Example/Comparative Example No. | | |
|---|---|---|---|
| | Example I-13 | Example I-14 | Example I-15 |
| Ink set | 1 | 9 | 10 |
| White ink or clear ink discharged first | WI-1 | WI-9 | WI-10 |
| Non-white ink discharged after white ink or clear ink | K1 C1 M1 Y1 | K1 C1 M1 Y1 | K1 C1 M1Y1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| Heating temperature T | 40 degrees C. | 40 degrees C. | 40 degrees C. |
| Bleed (rating) | A A A A | B B B B | B B B B |

| | Example/Comparative Example No. | | |
|---|---|---|---|
| | Example I-1 | Example I-6 | Example I-7 |
| Ink set | 1 | 9 | 10 |
| White ink or clear ink discharged first | WI-1 | WI-9 | WI-10 |
| Non-white ink discharged after white ink or clear ink | K1 C1 M1 Y1 | K1 C1 M1 Y1 | K1 C1 M1Y1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| temperature T | | 55 degrees C. | 55 degrees C. |
| Bleed (rating) | A A A A | A A A A | B B B B |

TABLE I-8-continued

| | Example/Comparative Example No. | | |
|---|---|---|---|
| | Example I-16 | Example I-17 | Example I-18 |
| Ink set | 1 | 9 | 10 |
| White ink or clear ink discharged first | WI-1 | WI-9 | WI-10 |
| Non-white ink discharged after white ink or clear ink | K1 C1 M1 Y1 | K1 C1 M1 Y1 | K1 C1 M1Y1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| Heating temperature T | 90 degrees C. | 90 degrees C. | 90 degrees C. |
| Bleed (rating) | A A A A | A A A A | A A A A |

Examples and Comparative Example of white ink containing β-alkoxy propionamide are as follows.

Examples II-1 to II-4, II-6 to II-18, Comparative Examples II-1 to II-8, and Reference Examples II-1 to II-6

White inks WII-1 to WII-14 were manufactured based on the prescriptions shown in Table II-1.

Non-white inks II-K1, K2, C1, C2, Ml, M2, Y1, and Y2 were manufactured based on the prescriptions shown in Table II-2.

Next, solid images of white ink discharged first were formed and evaluated in the same manner as in Example I-1.

The evaluation results are shown in Tables II-3 to II-8.

TABLE II-1

| | | | Note | WII-1 | WII-2 | WII-3 | WII-4 |
|---|---|---|---|---|---|---|---|
| Coloring material | White coloring material | Titanium oxide | White pigment dispersion 1 (pigment) | 8 percent | | 0 percent | 8 percent |
| | | Hollow particle | White pigment dispersion 2 (pigment) | | 8 percent | 0 percent | |
| | Organic solvent | PG | bp: 88 degrees C. | 15 percent | 15 percent | 15 percent | 15 percent |
| | | 1,2-HD | bp: 223 to 224 degrees C. | 5 percent | 5 percent | 5 percent | 5 percent |
| | | Glycerin | bp: 290 degrees C. | | | | |
| | β-alkoxy propionamide | Equamide ™ M100 | bp: 216 degrees C. | 3 percent | 3 percent | 3 percent | |
| | | Equamide ™ B100 | bp: 252 degrees C. | | | | 3 percent |
| | | 2-P | bp: 245 degrees C. | | | | |
| | | MMB | bp: 173 to 175 degrees C. | | | | |
| Resin | Urethane resin particle | SUPERFLEX ® 470 | Tg: −31 | 3 percent | 3 percent | 3 percent | 3 percent |

TABLE II-1-continued

| | | | | | | | |
|---|---|---|---|---|---|---|---|
| | | | degrees C. | | | | |
| | | SUPERFLEX ® 300 | Tg: −42 degrees C. | | | | |
| | | SUPERFLEX ® 210 | Tg: 41 degrees C. | | | | |
| | | SUPERFLEX ® 170 | Tg: 75 degrees C. | | | | |
| | | SUPERFLEX ® 150 | Tg: 40 degrees C. | | | | |
| | Water-soluble urethane resin | JONCRYL ® 585 | Tg: −20 degrees C. | | | | |
| | Acrylic silicone resin particle | AE980 | Tg: −14 degrees C. | | | | |
| | Surfactant | BYL-348 | Compound represented by Chemical formula 2 | 0.5 percent | 0.5 percent | 0.5 percent | 0.5 percent |
| | Water (rest) | | | 65.5 percent | 65.5 percent | 73.5 percent | 65.5 percent |
| | | | Note | WII-5 | WII-6 | WII-7 | WII-8 |
| Coloring material | White coloring material | Titanium Oxide | White pigment dispersion 1 (pigment) | 8 percent | 8 percent | 8 percent | 8 percent |
| | | Hollow particle | White pigment dispersion 2 (pigment) | | | | |
| | Organic solvent | PG | bp: 88 degrees C. | 15 percent | 15 percent | 18 percent | 12 percent |
| | | 1,2-HD | bp: 223 to 224 degrees C. | 5 percent | 5 percent | 5 percent | 2 percent |
| | | Glycerin | bp: 290 degrees C. | | | | 3 percent |
| | β-alkoxy propionamide | Equamide ™ M100 | bp: 216 degrees C. | 1.5 percent | | 0 percent | 3 percent |
| | | Equamide ™ B100 | bp: 252 degrees C. | | | 0 percent | |
| | | 2-P | bp: 245 degrees C. | | 3 percent | | |
| | | MMB | bp: 173 to 175 degrees C. | 1.5 percent | | | |
| Resin | Urethane resin particle | SUPERFLEX ® 470 | Tg: −31 degrees C. | 3 percent | 3 percent | 3 percent | 3 percent |
| | | SUPERFLEX ® 300 | Tg: −42 degrees C. | | | | |
| | | SUPERFLEX ® 210 | Tg: 41 degrees C. | | | | |
| | | SUPERFLEX ® 170 | Tg: 75 degrees C. | | | | |
| | | SUPERFLEX ® 150 | Tg: 40 degrees C. | | | | |
| | Water-soluble urethane resin | JONCRYL ® 585 | Tg: −20 degrees C. | | | | |
| | Acrylic silicone resin particle | AE980 | Tg: −14 degrees C. | | | | |
| | Surfactant | BYL-348 | Compound represented by Chemical formula 2 | 0.5 percent | 0.5 percent | 0.5 percent | 0.5 percent |
| | Water (rest) | | | 65.5 percent | 65.5 percent | 65.5 percent | 68.5 percent |
| | | | Note | WII-9 | WII-10 | WII-11 | WII-12 |

TABLE II-1-continued

| | | | | | | | |
|---|---|---|---|---|---|---|---|
| Coloring material | White coloring material | Titanium Oxide | White pigment dispersion 1 (pigment) | 8 percent | 8 percent | 8 percent | 8 percent |
| | | Hollow particle | White pigment dispersion 2 (pigment) | | | | |
| | Organic solvent | PG | bp: 88 degrees C. | 15 percent | 15 percent | 15 percent | 15 percent |
| | | 1,2-HD | bp: 223 to 224 degrees C. | 5 percent | 5 percent | 5 percent | 5 percent |
| | | Glycerin | bp: 290 degrees C. | | | | |
| | β-alkoxy propionamide | Equamide ™ M100 | bp: 216 degrees C. | 3 percent | 3 percent | 3 percent | 3 percent |
| | | Equamide ™ B100 | bp: 252 degrees C. | | | | |
| | | 2-P | bp: 245 degrees C. | | | | |
| | | MMB | bp: 173 to 175 degrees C. | | | | |
| Resin | Urethane resin particle | SUPERFLEX ® 470 | Tg: −31 degrees C. | | | | |
| | | SUPERFLEX ® 300 | Tg: −42 degrees C. | 3 percent | | | |
| | | SUPERFLEX ® 210 | Tg: 41 degrees C. | | 3 percent | | |
| | | SUPERFLEX ® 170 | Tg: 75 degrees C. | | | 3 percent | |
| | | SUPERFLEX ® 150 | Tg: 40 degrees C. | | | | 3 percent |
| | Water-soluble urethane resin | JONCRYL ® 585 | Tg: −20 degrees C. | | | | |
| | Acrylic silicone resin particle | AE980 | Tg: −14 degrees C. | | | | |
| | Surfactant | BYL-348 | Compound represented by Chemical formula 2 | 0.5 percent | 0.5 percent | 0.5 percent | 0.5 percent |
| | Water (rest) | | | 65.5 percent | 65.5 percent | 65.5 percent | 65.5 percent |

| | | | Note | WII-13 | WII-14 |
|---|---|---|---|---|---|
| Coloring material | White coloring material | Titanium Oxide | White pigment dispersion 1 (pigment) | 8 percent | 8 percent |
| | | Hollow particle | White pigment dispersion 2 (pigment) | | |
| | Organic solvent | PG | bp: 88 degrees C. | 15 percent | 15 percent |
| | | 1,2-HD | bp: 223 to 224 degrees C. | 5 percent | 5 percent |
| | | Glycerin | bp: 290 degrees C. | | |
| | β-alkoxy propionamide | Equamide ™ M100 | bp: 216 degrees C. | 3 percent | 3 percent |
| | | Equamide ™ B100 | bp: 252 degrees C. | | |
| | | 2-P | bp: 245 degrees C. | | |

TABLE II-1-continued

| | | | | | |
|---|---|---|---|---|---|
| | | MMB | bp: 173 to 175 degrees C. | | |
| Resin | Urethane resin particle | SUPERFLEX ® 470 | Tg: −31 degrees C. | | |
| | | SUPERFLEX ® 300 | Tg: −42 degrees C. | | |
| | | SUPERFLEX ® 210 | Tg: 41 degrees C. | | |
| | | SUPERFLEX ® 170 | Tg: 75 degrees C. | | |
| | | SUPERFLEX ® 150 | Tg: 40 degrees C. | | |
| | Water-soluble urethane resin | JONCRYL ® 585 | Tg: −20 degrees C. | 3 percent | |
| | Acrylic silicone resin particle | AE980 | Tg: −14 degrees C. | | 3 percent |
| | Surfactant | BYL-348 | Compound represented by Chemical formula 2 | 0.5 percent | 0.5 percent |
| | Water (rest) | | | 65.5 percent | 65.5 percent |

TABLE II-2

| | | | Note | K1 | C1 | M1 | Y1 |
|---|---|---|---|---|---|---|---|
| Coloring material | Non-white coloring material | Carbon black | Black pigment dispersion (pigment) | 3 percent | | | |
| | | Pigment Blue 15:3 | Cyan pigment dispersion (pigment) | | 3 percent | | |
| | | Pigment Red 122 | Magenta pigment dispersion (pigment) | | | 3 percent | |
| | | Pigment Yellow 155 | Yellow pigment dispersion (pigment) | | | | 3 percent |
| | Organic solvent | PG | bp: 188 degrees C. | 15 percent | 15 percent | 15 percent | 15 percent |
| | | 1,2-HD | bp: 223 to 224 degrees C. | 5 percent | 5 percent | 5 percent | 5 percent |
| | | Glycerin | bp: 290 degrees C. | | | | |
| | β-alkoxy propionamide | Equamide ™ M100 | bp: 216 degrees C. | 3 percent | 3 percent | 3 percent | 3 percent |
| | | Equamide ™ B100 | bp: 252 degrees C. | | | | |
| | | MMB | bp: 173 to 175 degrees C. | | | | |
| | | 2-P | bp: 245 degrees C. | | | | |
| Resin | Urethane resin particle | SUPERFLEX ® 470 | Tg: −31 degrees C. | 3 percent | 3 percent | 3 percent | 3 percent |
| | | SUPERFLEX ® 300 | Tg: −42 degrees C. | | | | |
| | | SUPERFLEX ® 210 | Tg: 41 degrees C. | | | | |
| | | SUPERFLEX ® 170 | Tg: 75 degrees C. | | | | |
| | | SUPERFLEX ® 150 | Tg: 40 degrees C. | | | | |
| | Water-soluble urethane resin | JONCRYL ® 585 | Tg: −20 degrees C. | | | | |
| | Acrylic silicone resin particle | AE980 | Tg: −14 degrees C. | | | | |

TABLE II-2-continued

| | | | | | | |
|---|---|---|---|---|---|---|
| Surfactant | BYL-348 | Compound represented by Chemical formula 2 | 0.5 percent | 0.5 percent | 0.5 percent | 0.5 percent |
| Water (rest) | | | 70.5 percent | 70.5 percent | 70.5 percent | 70.5 percent |

| | | | Note | K2 | C2 | M2 | Y2 | UC1 |
|---|---|---|---|---|---|---|---|---|
| Coloring material | Non-white coloring material | Carbon black | Black pigment dispersion (pigment) | 3 percent | | | | |
| | | Pigment Blue 15:3 | Cyan pigment dispersion (pigment) | | 3 percent | | | |
| | | Pigment Red 122 | Magenta pigment dispersion (pigment) | | | 3 percent | | |
| | | Pigment Yellow 155 | Yellow pigment dispersion (pigment) | | | | 3 percent | |
| | Organic solvent | PG | bp: 188 degrees C. | 15 percent | 15 percent | 15 percent | 15 percent | 15 percent |
| | | 1,2-HD | bp: 223 to 224 degrees C. | | | | | 5 percent |
| | | Glycerin | bp: 290 degrees C. | 5 percent | 5 percent | 5 percent | 5 percent | |
| | β-alkoxy propionamide | Equamide ™ M100 | bp: 216 degrees C. | 3 percent | 3 percent | 3 percent | 3 percent | 3 percent |
| | | Equamide ™ B100 | bp: 252 degrees C. | | | | | |
| | | MMB | bp: 173 to 175 degrees C. | | | | | |
| | | 2-P | bp: 245 degrees C. | | | | | |
| Resin | Urethane resin particle | SUPERFLEX ® 470 | Tg: −31 degrees C. | 3 percent | 3 percent | 3 percent | 3 percent | 6 percent |
| | | SUPERFLEX ® 300 | Tg: −42 degrees C. | | | | | |
| | | SUPERFLEX ® 210 | Tg: 41 degrees C. | | | | | |
| | | SUPERFLEX ® 170 | Tg: 75 degrees C. | | | | | |
| | | SUPERFLEX ® 150 | Tg: 40 degrees C. | | | | | |
| | Water-soluble urethane resin | JONCRYL ® 585 | Tg: −20 degrees C. | | | | | |
| | Acrylic silicone resin particle | AE980 | Tg: −14 degrees C. | | | | | |
| Surfactant | | BYL-348 | Compound represented by Chemical formula 2 | 0.5 percent | 0.5 percent | 0.5 percent | 0.5 percent | 0.5 percent |
| Water (rest) | | | | 70.5 percent | 70.5 percent | 70.5 percent | 70.5 percent | 70.5 percent |

TABLE II-3

| | Example/Comparative Example No. | | |
|---|---|---|---|
| | Example II-1 | Example II-2 | Comparative Example II-1 |
| Ink set | 1 | 2 | 3 |
| White ink or clear ink discharged first | WII-1 | WII-2 | WII-3 |
| Non-white ink discharged after white ink or clear ink | K1 C1 M1 Y1 | K1 C1 M1 Y1 | K1 C1 M1 Y1 |
| Drying ratio X of ink discharged first | 20 percent | 20 percent | 20 percent |
| Sequence of discharging | White ink to non-white ink | White ink to non-white ink | White ink to clear ink |
| Heating temperature T | | 55 degrees C. | |
| | A A A A | A A A A | C C C C |

TABLE II-4

| | Example/Comparative Example No. | | |
|---|---|---|---|
| | Example II-1 | Example II-3 | Example II-4 |
| Ink set | 1 | 4 | 5 |
| White ink or clear ink discharged first | WII-1 | WII-4 | WII-5 |
| Non-white ink discharged after white ink or clear ink | K1 C1 M1 Y1 | K1 C1 M1 Y1 | K1 C1 M1 Y1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| Bleed (rating) | A A A A | A A A A | A A A A |

| | Example/Comparative Example No. | |
|---|---|---|
| | Comparative Example II-8 | Comparative Example II-2 |
| Ink set | 6 | 7 |
| White ink or clear ink discharged first | WII-6 | WII-7 |
| Non-white ink discharged after white ink or clear ink | K1 C1 M1 Y1 | K1 C1 M1 Y1 |
| Drying ratio X of ink discharged first | 20 percent | 20 percent |
| Sequence of discharging | White ink to non-white ink | White ink to non-white ink |
| Heating temperature T | 55 degrees C. | |
| Bleed (rating) | C C C C | C C C C |

TABLE II-5

| | Example/Comparative Example No. | | |
|---|---|---|---|
| | Example II-1 | Comparative Example II-3 | Comparative Example II-7 |
| Ink set | 1 | 8 | 1 |
| White ink or clear ink discharged first | WII-1 | WII-8 | WII-1 |
| Non-white ink discharged after white ink or clear ink | K1 C1 M1 Y1 | K1 C1 M1 Y1 | K2 C2 M2 Y2 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| Bleed (rating) | A A A A | D D D D | D D D D |

TABLE II-6

| | Example/Comparative Example No. | | |
|---|---|---|---|
| | Example II-1 | Example II-6 | Example II-7 |
| Ink set | 1 | 9 | 10 |
| White ink or clear ink discharged first | WII-1 | WII-9 | WII-10 |
| Non-white ink discharged after white ink or clear ink | K1 C1 M1 Y1 | K1 C1 M1 Y1 | K1 C1 M1 Y1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| Bleed (rating) | A A A A | A A A A | B B B B |

| | Example/Comparative Example No. | | |
|---|---|---|---|
| | Example II-8 | Example II-9 | Example II-10 |
| Ink set | 11 | 12 | 13 |
| White ink or clear ink discharged first | WII-11 | WII-12 | WII-13 |
| Non-white ink discharged after white ink or clear ink | K1 C1 M1 Y1 | K1 C1 M1 Y1 | K1 C1 M1 Y1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| Bleed (rating) | B B B B | A A A A | B B B B |

| | Example/Comparative Example No. Comparative Example II-4 |
|---|---|
| Ink set | 14 |
| White ink or clear ink discharged first | WII-14 |

TABLE II-6-continued

| | | | | |
|---|---|---|---|---|
| Non-white ink discharged after white ink or clear ink | K1 | C1 | M1 | Y1 |
| Drying ratio X of ink discharged first | 20 percent | | | |
| Sequence of discharging | White ink to non-white ink | | | |
| Heating temperature T | 55 degrees C. | | | |
| Bleed (rating) | C | C | C | C |

TABLE II-7

| | Example/Comparative Example No. | | | | | | | | | | | |
|---|---|---|---|---|---|---|---|---|---|---|---|---|
| | Example II-1 | | | | Example II-10 | | | | Comparative Example II-5 | | | |
| Ink set | 1 | | | | 13 | | | | 14 | | | |
| White ink or clear ink discharged first | WII-1 | | | | WII-13 | | | | WII-14 | | | |
| Non-white ink discharged after white ink or clear ink | K1 | C1 | M1 | Y1 | K1 | C1 | M1 | Y1 | K1 | C1 | M1 | Y1 |
| Drying ratio X of ink discharged first | 20 percent | | | | 20 percent | | | | 20 percent | | | |
| Sequence of discharging | White ink to non-white ink | | | | White ink to non-white ink | | | | White ink to non-white ink | | | |
| Heating temperature T | 55 degrees C. | | | | | | | | | | | |
| Bleed (rating) | A | A | A | A | B | B | B | B | C | C | C | C |

| | Example/Comparative Example No. | | | | | | | | | | | |
|---|---|---|---|---|---|---|---|---|---|---|---|---|
| | Example II-11 | | | | Example II-12 | | | | Comparative Example II-6 | | | |
| Ink set | 1 | | | | 13 | | | | 14 | | | |
| White ink or clear ink discharged first | WII-1 | | | | WII-13 | | | | WII-14 | | | |
| Non-white ink discharged after white ink or clear ink | K1 | C1 | M1 | Y1 | K1 | C1 | M1 | Y1 | K1 | C1 | M1 | Y1 |
| Drying ratio X of ink discharged first | 30 percent | | | | 30 percent | | | | 30 percent | | | |
| Sequence of discharging | White ink to non-white ink | | | | White ink to non-white ink | | | | White ink to non-white ink | | | |
| Heating temperature T | 55 degrees C. | | | | | | | | | | | |
| Bleed (rating) | A | A | A | A | B | B | B | B | C | C | C | C |

| | Example/Comparative Example No. | | | | | | | | | | | |
|---|---|---|---|---|---|---|---|---|---|---|---|---|
| | Reference Example II-1 | | | | Reference Example II-2 | | | | Reference Example II-3 | | | |
| Ink set | 1 | | | | 13 | | | | 14 | | | |
| White ink or clear ink discharged first | WII-1 | | | | WII-13 | | | | WII-14 | | | |
| Non-white ink discharged after white ink | K1 | C1 | M1 | Y1 | C1 | M1 | Y1 | Y1 | K1 | C1 | M1 | Y1 |
| Drying ratio X of ink discharged first | 35 percent | | | | 35 percent | | | | 35 percent | | | |
| Sequence of discharging | White ink to non-white ink | | | | White ink to non-white ink | | | | White ink to non-white ink | | | |
| Heating temperature T | 55 degrees C. | | | | | | | | | | | |
| Bleed (rating) | A | A | A | A | A | A | A | B | B | B | B | B |

| | Example/Comparative Example No. | | | | | | | | | | | |
|---|---|---|---|---|---|---|---|---|---|---|---|---|
| | Reference Example II-4 | | | | Reference Example II-5 | | | | Reference Example II-6 | | | |
| Ink set | 1 | | | | 13 | | | | 14 | | | |
| White ink or clear ink discharged first | WII-1 | | | | WII-13 | | | | WII-14 | | | |
| Non-white ink discharged after white ink | K1 | C1 | M1 | Y1 | C1 | M1 | Y1 | Y1 | K1 | C1 | M1 | Y1 |
| Drying ratio X of ink discharged first | 40 percent | | | | 40 percent | | | | 40 percent | | | |
| Sequence of discharging | White ink to non-white ink | | | | White ink to non-white ink | | | | White ink to non-white ink | | | |

TABLE II-7-continued

| | |
|---|---|
| Heating temperature T | 55 degrees C. |
| Bleed (rating) | A A A A A A A A B B B B |

TABLE II-8

| | Example/Comparative Example No. | | |
|---|---|---|---|
| | Example II-13 | Example II-14 | Example II-15 |
| Ink set | 1 | 9 | 10 |
| White ink or clear ink discharged first | WII-1 | WII-9 | WII-10 |
| Non-white ink discharged after white ink | K1 C1 M1 Y1 | K1 C1 M1 Y1 | K1 C1 M1 Y1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| Heating temperature T | 40 degrees C. | 40 degrees C. | 40 degrees C. |
| Bleed (rating) | A A A A | B B B B | B B B B |

| | Example/Comparative Example No. | | |
|---|---|---|---|
| | Example II-1 | Example II-6 | Example II-7 |
| Ink set | 1 | 9 | 10 |
| White ink or clear ink discharged first | WII-1 | WII-9 | WII-10 |
| Non-white ink discharged after white ink or clear ink | K1 C1 M1 Y1 | K1 C1 M1 Y1 | K1 C1 M1 Y1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| Heating temperature T | 55 degrees C. | 55 degrees C. | 55 degrees C. |
| Bleed (rating) | A A A A | A A A A | B B B B |

| | Example/Comparative Example No. | | |
|---|---|---|---|
| | Example II-16 | Example II-17 | Example II-18 |
| Ink set | 1 | 9 | 10 |
| White ink or clear ink discharged first | WII-1 | WII-9 | WII-10 |
| Non-white ink discharged after white ink or clear ink | K1 C1 M1 Y1 | K1 C1 M1 Y1 | K1 C1 M1 Y1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| Heating temperature T | 90 degrees C. | 90 degrees C. | 90 degrees C. |
| Bleed (rating) | A A A A | A A A A | A A A A |

Examples III-1 to III-18, Comparative Examples III-1 to 1II-6, and Reference Examples III-1 to 1II-6

Using each ink prepared as described above, solid images were formed and evaluated in the same manner as in Example I-1 except that the non-white ink was discharged first and thereafter the white ink was discharged thereon. The evaluation results are shown in Tables III-1 to 1II-6.

TABLE III-1

| | Example/Comparative Example No. | | |
|---|---|---|---|
| | Example III-1 | Example III-2 | Comparative Example III-1 |
| Ink set | 1 | 2 | 3 |
| Non-white ink discharged first | K1 C1 M1 Y1 | K1 C1 M1 Y1 | K1 C1 M1 Y1 |
| White ink or clear ink discharged after non-white ink | WI-1 | WI-2 | WI-3 |
| Drying ratio X of ink discharged first | 20 percent | 20 percent | 20 percent |
| Sequence of discharging | Non-white ink to white ink | Non-white ink to white ink | Non-white ink to clear ink |
| Heating temperature T | | 55 degrees C. | |
| Bleed (rating) | A A A A | A A A A | C C C C |
| Changing amount of L value (percent) | 0 0 0 0 | 3 3 3 3 | 5 5 5 5 |

TABLE III-2

| | Example/Comparative Example No. | | |
|---|---|---|---|
| | Example III-1 | Example III-3 | Example III-4 |
| Ink set | 1 | 4 | 5 |
| Non-white ink discharged first | K1 C1 M1 Y1 | K1 C1 M1 Y1 | K1 C1 M1 Y1 |
| White ink or clear ink discharged after non-white ink | WI-1 | WI-4 | WI-5 |
| Drying ratio X of ink discharged first | 20 percent | 20 percent | 20 percent |
| Sequence of discharging | Non-white ink to white ink | Non-white ink to white ink | Non-white ink to white ink |
| Heating temperature T | | 55 degrees C. | |
| Bleed (rating) | A A A A | A A A B | AA AA AA A |

| | Example/Comparative Example No. | |
|---|---|---|
| | Example III-5 | Example III-19 |
| Ink set | 6 | 15 |
| Non-white ink discharged first | K1 C1 M1 Y1 | K1 C1 M1 Y1 |
| White ink or clear ink discharged after | WI-6 | WI-15 |

TABLE III-2-continued

| | | | | | | | | |
|---|---|---|---|---|---|---|---|---|
| non-white ink | | | | | | | | |
| Drying ratio X of ink discharged first | 20 percent | | | | 20 percent | | | |
| Sequence of discharging | Non-white ink to white ink | | | | Non-white ink to white ink | | | |
| Heating temperature T | 55 degrees C. | | | | | | | |
| Bleed (rating) | B | B | B | B | AA | AA | AA | AA |

TABLE III-3

| | Example/Comparative Example No. | | | | | | | | | | | |
|---|---|---|---|---|---|---|---|---|---|---|---|---|
| | Example III-1 | | | | Comparative Example III-2 | | | | Comparative Example III-3 | | | |
| Ink set | 1 | | | | 7 | | | | 8 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WI-1 | | | | WI-7 | | | | WI-8 | | | |
| Drying ratio X of ink discharged first | 20 percent | | | | 20 percent | | | | 20 percent | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | A | A | A | A | C | C | C | C | D | D | D | D |

TABLE III-4

| | Example/Comparative Example I No. | | | | | | | | | | | |
|---|---|---|---|---|---|---|---|---|---|---|---|---|
| | Example III-1 | | | | Example III-6 | | | | Example III-7 | | | |
| Ink set | 1 | | | | 9 | | | | 10 | | | |
| Non-white ink discharged first | K1 | C1 | M1 | Y1 | K1 | C1 | M1 | Y1 | K1 | C1 | M1 | Y1 |
| White ink discharged after non-white ink or clear ink | WI-1 | | | | WI-9 | | | | WI-10 | | | |
| Drying ratio X of ink discharged first | 20 percent | | | | 20 percent | | | | 20 percent | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | A | A | A | A | A | A | A | A | B | B | B | B |

| | Example/Comparative Example I No. | | | | | | | | | | | |
|---|---|---|---|---|---|---|---|---|---|---|---|---|
| | Example III-8 | | | | Example III-9 | | | | Example III-10 | | | |
| Ink set | 11 | | | | 12 | | | | 13 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WI-11 | | | | WI-12 | | | | WI-13 | | | |
| Drying ratio X of ink discharged first | 20 percent | | | | 20 percent | | | | 20 percent | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | B | B | B | B | A | A | A | A | B | B | B | B |

TABLE III-4-continued

| | Example/Comparative Example I No. Comparative Example III-4 | | | |
|---|---|---|---|---|
| Ink set | 14 | | | |
| Non-white ink discharged first | K1 | C1 | M1 | Y1 |
| White ink or clear ink discharged after non-white ink | WI-14 | | | |
| Drying ratio X of ink discharged first | 20 percent | | | |
| Sequence of discharging | Non-white ink to white ink | | | |
| Heating temperature T | 55 degrees C. | | | |
| Bleed (rating) | C | C | C | C |

TABLE III-5

| | Example/Comparative Example No. | | | | | | | | | | | |
|---|---|---|---|---|---|---|---|---|---|---|---|---|
| | Example III-1 | | | | Example III-10 | | | | Comparative Example III-5 | | | |
| Ink set | 1 | | | | 13 | | | | 14 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WI-1 | | | | WI-13 | | | | WI-14 | | | |
| Drying ratio X of ink discharged first | 20 percent | | | | 20 percent | | | | 20 percent | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | A | A | A | A | B | B | B | B | C | C | C | C |

| | Example/Comparative Example No. | | | | | | | |
|---|---|---|---|---|---|---|---|---|
| | Example III-11 | | | | Example III-12 | | | |
| Ink set | 1 | | | | 13 | | | |
| Non-white ink discharged first | K1 | C1 | M1 | Y1 | K1 | C1 | M1 | Y1 |
| White ink or clear ink discharged after non-white ink | WI-1 | | | | WI-13 | | | |
| Drying ratio X of ink discharged first | 30 percent | | | | 30 percent | | | |
| Sequence of discharging | Non-white ink to white ink | | | | Non-white ink to white ink | | | |
| Heating temperature T | 55 degrees C. | | | | | | | |
| Bleed (rating) | A | A | A | A | B | B | B | B |

| | Example/Comparative Example No. | | | | | | | |
|---|---|---|---|---|---|---|---|---|
| | Comparative Example III-6 | | | | Reference Example III-1 | | | |
| Ink set | 14 | | | | 1 | | | |
| Non-white ink discharged first | K1 | C1 | M1 | Y1 | K1 | C1 | M1 | Y1 |
| White ink or clear ink discharged after non-white ink | WI-14 | | | | WI-1 | | | |
| Drying ratio X of ink | 30 percent | | | | 35 percent | | | |

TABLE III-5-continued

| | | | | | | | | |
|---|---|---|---|---|---|---|---|---|
| discharged first | | | | | | | | |
| Sequence of discharging | Non-white ink to white ink | | | | Non-white ink to white ink | | | |
| Heating temperature T | 55 degrees C. | | | | | | | |
| Bleed (rating) | C | C | C | C | A | A | A | A |

| | Example/Comparative Example No. | | | | | | | | | | | |
|---|---|---|---|---|---|---|---|---|---|---|---|---|
| | Reference Example III-2 | | | | Reference Example III-3 | | | | Reference Example III-4 | | | |
| Ink set | 13 | | | | 14 | | | | 1 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WI-13 | | | | WI-14 | | | | WI-1 | | | |
| Drying ratio X of ink discharged first | 35 percent | | | | 35 percent | | | | 40 percent | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | B | B | B | B | B | B | B | B | A | A | A | A |

| | Example/Comparative Example No. | | | | | | | |
|---|---|---|---|---|---|---|---|---|
| | Reference Example III-5 | | | | Reference Example III-6 | | | |
| Ink set | 13 | | | | 14 | | | |
| Non-white ink discharged first | K1 | C1 | M1 | Y1 | K1 | C1 | M1 | Y1 |
| White ink or clear ink discharged after non-white ink | WI-13 | | | | WI-14 | | | |
| Drying ratio X of ink discharged first | 40 percent | | | | 40 percent | | | |
| Sequence of discharging | Non-white ink to white ink | | | | Non-white ink to white ink | | | |
| Heating temperature T | 55 degrees C. | | | | | | | |
| Bleed (rating) | A | A | A | A | B | B | B | B |

TABLE III-6

| | Example/Comparative Example No. | | | | | | | | | | | |
|---|---|---|---|---|---|---|---|---|---|---|---|---|
| | Example III-13 | | | | Example III-14 | | | | Example III-15 | | | |
| Ink set | 1 | | | | 9 | | | | 10 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WI-1 | | | | WI-9 | | | | WI-10 | | | |
| Drying ratio X of ink discharged first | 20 percent | | | | 20 percent | | | | 20 percent | | | |
| Sequence of discharging | White ink to non-white ink | | | | White ink to non-white ink | | | | White ink to non-white ink | | | |
| Resin Tg in white ink | −31 degrees C. | | | | 75 degrees C. | | | | 40 degrees C. | | | |

TABLE III-6-continued

| | | | | | | | | | | | | |
|---|---|---|---|---|---|---|---|---|---|---|---|---|
| Heating temperature T | 40 degrees C. | | | | 40 degrees C. | | | | 40 degrees C. | | | |
| Bleed (rating) | A | A | A | A | B | B | B | B | B | B | B | B |

| | Example/Comparative Example No. | | | | | | | | | | | |
|---|---|---|---|---|---|---|---|---|---|---|---|---|
| | Example III-1 | | | | Example III-6 | | | | Example III-7 | | | |
| Ink set | 1 | | | | 9 | | | | 10 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WI-1 | | | | WI-9 | | | | WI-10 | | | |
| Drying ratio X of ink discharged first | 20 percent | | | | 20 percent | | | | 20 percent | | | |
| Sequence of discharging | White ink to non-white ink | | | | White ink to non-white ink | | | | White ink to non-white ink | | | |
| Resin Tg in white ink | −31 degrees C. | | | | 75 degrees C. | | | | 40 degrees C. | | | |
| Heating temperature T | 55 degrees C. | | | | 55 degrees C. | | | | 55 degrees C. | | | |
| Bleed (rating) | A | A | A | A | A | A | A | A | B | B | B | B |

| | Example/Comparative Example No. | | | | | | | | | | | |
|---|---|---|---|---|---|---|---|---|---|---|---|---|
| | Example III-16 | | | | Example III-17 | | | | Example III-18 | | | |
| Ink set | 1 | | | | 9 | | | | 10 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WI-1 | | | | WI-9 | | | | WI-10 | | | |
| Drying ratio X of ink discharged first | 20 percent | | | | 20 percent | | | | 20 percent | | | |
| Sequence of discharging | White ink to non-white ink | | | | White ink to non-white ink | | | | White ink to non-white ink | | | |
| Resin Tg in white ink or clear ink | −31 degrees C. | | | | 75 degrees C. | | | | 40 degrees C. | | | |
| Heating temperature T | 90 degrees C. | | | | 90 degrees C. | | | | 90 degrees C. | | | |
| Bleed (rating) | A | A | A | A | A | A | A | A | A | A | A | A |

Examples IV-1 to IV-4, IV-6 to IV-18, Comparative Examples IV-1 to IV-8, and Reference Examples IV-1 to IV-6

Using each ink prepared as described above, solid images were formed and evaluated in the same manner as in Example I-1 except that the non-white ink was discharged first and thereafter the white ink was discharged thereon.

The evaluation results are shown in Tables IV-1 to IV-6.

TABLE IV-1

| | Example/Comparative Example No. | | | | | | | | | | | |
|---|---|---|---|---|---|---|---|---|---|---|---|---|
| | Example IV-1 | | | | Example IV-2 | | | | Comparative Example IV-1 | | | |
| Ink set | 1 | | | | 2 | | | | 3 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WII-1 | | | | WII-2 | | | | WII-3 | | | |
| Drying ratio X of ink | 20 percent | | | | 20 percent | | | | 20 percent | | | |

TABLE IV-1-continued

| | Example/Comparative Example No. | | |
|---|---|---|---|
| | Example IV-1 | Example IV-2 | Comparative Example IV-1 |
| discharged first | | | |
| Sequence of discharging | Non-white ink to white ink | Non-white ink to white ink | Non-white ink to clear ink |
| Heating temperature T | | 55 degrees C. | |
| Bleed (rating) | A A A A | A A A A | C C C C |

TABLE IV-2

| | Example/Comparative Example No. | | |
|---|---|---|---|
| | Example IV-1 | Example IV-3 | Example IV-4 |
| Ink set | 1 | 4 | 5 |
| Non-white ink discharged first | K1 C1 M1 Y1 | K1 C1 M1 Y1 | K1 C1 M1 Y1 |
| White ink or clear ink discharged after non-white ink | WII-1 | WII-4 | WII-5 |
| Drying ratio X of ink discharged first | 20 percent | 20 percent | 20 percent |
| Sequence of discharging | Non-white ink to white ink | Non-white ink to white ink | Non-white ink to white ink |
| Heating temperature T | | 55 degrees C. | |
| Bleed (rating) | A A A A | A A A A | A A A A |

| | Example/Comparative Example No. | |
|---|---|---|
| | Comparative Example IV-8 | Comparative Example IV-2 |
| Ink set | 6 | 7 |
| Non-white ink discharged first | K1 C1 M1 Y1 | K1 C1 M1 Y1 |
| White ink or clear ink discharged after non-white ink | WII-6 | WII-7 |
| Drying ratio X of ink discharged first | 20 percent | 20 percent |
| Sequence of discharging | Non-white ink to white ink | Non-white ink to white ink |
| Heating temperature T | 55 degrees C. | |
| Bleed (rating) | C C C C | C C C C |

TABLE IV-3

| | Example/Comparative Example No. | | |
|---|---|---|---|
| | Example IV-1 | Comparative Example IV-3 | Comparative Example IV-7 |
| Ink set | 1 | 8 | 1 |
| Non-white ink discharged first | K1 C1 M1 Y1 | K1 C1 M1 Y1 | K2 C2 M2 Y2 |
| White ink or clear ink discharged after non-white ink | WII-1 | WII-8 | WII-1 |
| Drying ratio X of ink discharged first | 20 percent | 20 percent | 20 percent |
| Sequence of discharging | Non-white ink to white ink | Non-white ink to white ink | Non-white ink to white ink |
| Heating temperature T | | 55 degrees C. | |
| Bleed (rating) | A A A A | D D D D | D D D D |

TABLE IV-4

| | Example/Comparative Example No. | | |
|---|---|---|---|
| | Example IV-1 | Example IV-6 | Example IV-7 |
| Ink set | 1 | 9 | 10 |
| Non-white ink discharged first | K1 C1 M1 Y1 | K1 C1 M1 Y1 | K1 C1 M1 Y1 |
| White ink or clear ink discharged after non-white ink | WII-1 | WII-9 | WII-10 |
| Drying ratio X of ink | 20 percent | 20 percent | 20 percent |

TABLE IV-4-continued

| | | | | | | | | | | | | |
|---|---|---|---|---|---|---|---|---|---|---|---|---|
| discharged first | | | | | | | | | | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | A | A | A | A | A | A | A | A | B | B | B | B |

| | Example/Comparative Example No. | | | | | | | |
|---|---|---|---|---|---|---|---|---|
| | Example IV-8 | | | | Example IV-9 | | | |
| Ink set | 11 | | | | 12 | | | |
| Non-white ink discharged first | K1 | C1 | M1 | Y1 | K1 | C1 | M1 | Y1 |
| White ink or clear ink discharged after non-white ink | WII-11 | | | | WII-12 | | | |
| Drying ratio X of ink discharged first | 20 percent | | | | 20 percent | | | |
| Sequence of discharging | Non-white ink to white ink | | | | Non-white ink to white ink | | | |
| Heating temperature T | 55 degrees C. | | | | | | | |
| Bleed (rating) | B | B | B | B | A | A | A | A |

| | Example/Comparative Example No. | | | | | | | |
|---|---|---|---|---|---|---|---|---|
| | Example IV-10 | | | | Comparative Example IV-4 | | | |
| Ink set | 13 | | | | 14 | | | |
| Non-white ink discharged first | K1 | C1 | M1 | Y1 | K1 | C1 | M1 | Y1 |
| White ink or clear ink discharged after non-white ink | WII-13 | | | | WII-14 | | | |
| Drying ratio X of ink discharged first | 20 percent | | | | 20 percent | | | |
| Sequence of discharging | Non-white ink to white ink | | | | Non-white ink to white ink | | | |
| Heating temperature T | 55 degrees C. | | | | | | | |
| Bleed (rating) | B | B | B | B | C | C | C | C |

TABLE IV-5

| | Example/Comparative Example No. | | | | | | | | | | | |
|---|---|---|---|---|---|---|---|---|---|---|---|---|
| | Example IV-1 | | | | Example IV-10 | | | | Comparative Example IV-5 | | | |
| Ink set | 1 | | | | 13 | | | | 14 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WII-1 | | | | WII-13 | | | | WII-14 | | | |
| Drying ratio X of ink discharged first | 20 percent | | | | 20 percent | | | | 20 percent | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | A | A | A | A | B | B | B | B | C | C | C | C |

| | Example/Comparative Example No. | | | | | | | |
|---|---|---|---|---|---|---|---|---|
| | Example IV-11 | | | | Example IV-12 | | | |
| Ink set | 1 | | | | 13 | | | |
| Non-white ink discharged first | K1 | C1 | M1 | Y1 | K1 | C1 | M1 | Y1 |
| White ink or clear ink discharged after non-white ink | WII-1 | | | | WII-13 | | | |
| Drying ratio X of ink discharged first | 30 percent | | | | 30 percent | | | |
| Sequence of discharging | Non-white ink to white ink | | | | Non-white ink to white ink | | | |
| Heating temperature T | 55 degrees C. | | | | | | | |
| Bleed (rating) | A | A | A | A | B | B | B | B |

TABLE IV-5-continued

| | Example/Comparative Example No. | | | | | | | |
|---|---|---|---|---|---|---|---|---|
| | Comparative Example IV-6 | | | | Reference Example IV-1 | | | |
| Ink set | 14 | | | | 1 | | | |
| Non-white ink discharged first | K1 | C1 | M1 | Y1 | K1 | C1 | M1 | Y1 |
| White ink or clear ink discharged after non-white ink | WII-14 | | | | WII-1 | | | |
| Drying ratio X of ink discharged first | 30 percent | | | | 35 percent | | | |
| Sequence of discharging | Non-white ink to white ink | | | | Non-white ink to white ink | | | |
| Heating temperature T | 55 degrees C. | | | | | | | |
| Bleed (rating) | C | C | C | C | A | A | A | A |

| | Example/Comparative Example No. | | | | | | | | | | | |
|---|---|---|---|---|---|---|---|---|---|---|---|---|
| | Reference Example IV-2 | | | | Reference Example IV-3 | | | | Reference Example IV-4 | | | |
| Ink set | 13 | | | | 14 | | | | 1 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WII-13 | | | | WII-14 | | | | WII-1 | | | |
| Drying ratio X of ink discharged first | 35 percent | | | | 35 percent | | | | 40 percent | | | |
| Sequence of discharging | Non-white ink to white ink | | | | Non-white ink to white ink | | | | Non-white ink to white ink | | | |
| Heating temperature T | 55 degrees C. | | | | | | | | | | | |
| Bleed (rating) | B | B | B | B | B | B | B | B | A | A | A | A |

| | Example/Comparative Example No. | | | | | | | |
|---|---|---|---|---|---|---|---|---|
| | Reference Example IV-5 | | | | Reference Example IV-6 | | | |
| Ink set | 13 | | | | 14 | | | |
| Non-white ink discharged first | K1 | C1 | M1 | Y1 | K1 | C1 | M1 | Y1 |
| White ink or clear ink discharged after non-white ink | WII-13 | | | | WII-14 | | | |
| Drying ratio X of ink discharged first | 40 percent | | | | 40 percent | | | |
| Sequence of discharging | Non-white ink to white ink | | | | Non-white ink to white ink | | | |
| Heating temperature T | 55 degrees C. | | | | | | | |
| Bleed (rating) | A | A | A | A | B | B | B | B |

TABLE IV-6

| | Example/Comparative Example No. | | | | | | | | | | | |
|---|---|---|---|---|---|---|---|---|---|---|---|---|
| | Example IV-13 | | | | Example IV-14 | | | | Example IV-15 | | | |
| Ink set | 1 | | | | 9 | | | | 10 | | | |
| Non-white ink discharged first | K1 | C1 | M1 | Y1 | K1 | C1 | M1 | Y1 | K1 | C1 | M1 | Y1 |
| White ink or clear ink discharged after non-white ink | WII-1 | | | | WII-9 | | | | WII-10 | | | |
| Drying ratio X of ink discharged first | 20 percent | | | | 20 percent | | | | 20 percent | | | |
| Sequence of discharging | Non-white ink to white ink | | | | Non-white ink to white ink | | | | Non-white ink to white ink | | | |
| Resin Tg in white ink or clear ink | −31 degrees C. | | | | 75 degrees C. | | | | 40 degrees C. | | | |

TABLE IV-6-continued

| | | | |
|---|---|---|---|
| Heating temperature T | 40 degrees C. | 40 degrees C. | 40 degrees C. |
| Bleed (rating) | A A A A | B B B B | B B B B |

| | Example/Comparative Example No. | | |
|---|---|---|---|
| | Example IV-1 | Example IV-9 | Example IV-10 |
| Ink set | 1 | 9 | 10 |
| Non-white ink discharged first | K1 C1 M1 Y1 | K1 C1 M1 Y1 | K1 C1 M1 Y1 |
| White ink discharged after non-white ink | WII-1 | WII-9 | WII-10 |
| Drying ratio X of ink discharged first | 20 percent | 20 percent | 20 percent |
| Sequence of discharging | Non-white ink to white ink | Non-white ink to white ink | Non-white ink to white ink |
| Resin Tg in white ink or clear ink | −31 degrees C. | 75 degrees C. | 40 degrees C. |
| Heating temperature T | 55 degrees C. | 55 degrees C. | 55 degrees C. |
| Bleed (rating) | A A A A | A A A A | B B B B |

| | Example/Comparative Example No. | | |
|---|---|---|---|
| | Example IV-16 | Example IV-17 | Example IV-18 |
| Ink set | 1 | 9 | 10 |
| Non-white ink discharged first | K1 C1 M1 Y1 | K1 C1 M1 Y1 | K1 C1 M1 Y1 |
| White ink or clear ink discharged after non-white ink | WII-1 | WII-9 | WII-10 |
| Drying ratio X of ink discharged first | 20 percent | 20 percent | 20 percent |
| Sequence of discharging | Non-white ink to white ink | Non-white ink to white ink | Non-white ink to white ink |
| Resin Tg in white ink | −31 degrees C. | 75 degrees C. | 40 degrees C. |
| Heating temperature T | 90 degrees C. | 90 degrees C. | 90 degrees C. |
| Bleed (rating) | A A A A | A A A A | A A A A |

Examples V-1 to V-19, Comparative Examples V-2 to V-6, and Reference Examples V-1 to V-6

Using each ink prepared as described above, solid images were formed and evaluated in the same manner as in Example I-1 except that the white ink was discharged first and thereafter the non-white ink including no coloring material was discharged thereon.

The evaluation results are shown in Tables IV-1 to IV-6.

TABLE V-1

| | Example/Comparative Example No. | |
|---|---|---|
| | Example V-1 | Example V-2 |
| Ink set | 1 | 2 |
| White ink or clear ink discharged first | WI-1 | WI-2 |
| Non-white ink discharged after white ink or clear ink | OC1 | OC1 |
| Drying ratio X of ink discharged first | 20 percent | 20 percent |
| Sequence of discharging | White ink to non-white ink | White ink to non-white ink |
| Heating temperature T | 55 degrees C. | |
| White bleed (rating) | A | A |
| Changing amount of L value (percent) | 0 | 3 |

TABLE V-2

| | Example/Comparative Example No. | | |
|---|---|---|---|
| | Example V-1 | Example V-3 | Example V-4 |
| Ink set | 1 | 4 | 5 |
| White ink or clear ink discharged first | WI-1 | WI-4 | WI-5 |
| Non-white ink discharged after white ink | OC1 | OC1 | OC1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| White bleed (rating) | A | A | AA |

| | Example/Comparative Example No. | |
|---|---|---|
| | Example V-5 | Example V-19 |
| Ink set | 6 | 15 |
| White ink or clear ink discharged first | WI-6 | WI-15 |
| Non-white ink discharged after white ink or clear ink | OC1 | OC1 |
| Drying ratio X of ink discharged first | 20 percent | 20 percent |
| Sequence of discharging | White ink to non-white ink | White ink to non-white ink |
| Heating temperature T | 55 degrees C. | |
| White bleed (rating) | B | AA |

TABLE V-3

| | Example/Comparative Example No. | | |
|---|---|---|---|
| | Example V-1 | Comparative Example V-2 | Comparative Example V-3 |
| Ink set | 1 | 7 | 8 |
| White ink or clear ink discharged first | WI-1 | WI-7 | WI-8 |
| Non-white ink discharged after white ink or clear ink | OC1 | OC1 | OC1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| White bleed (rating) | A | C | D |

TABLE V-4

| | Example/Comparative Example V- No. | | |
|---|---|---|---|
| | Example V-1 | Example V-6 | Example V-7 |
| Ink set | 1 | 9 | 10 |
| White ink or clear ink discharged first | WI-1 | WI-9 | WI-10 |
| Non-white ink discharged after white ink | OC1 | OC1 | OC1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| White bleed (rating) | A | A | B |

| | Example/Comparative Example V- No. | |
|---|---|---|
| | Example V-8 | Example V-9 |
| Ink set | 11 | 12 |
| White ink or clear ink discharged first | WI-11 | WI-12 |
| Non-white ink discharged after white ink or clear ink | OC1 | OC1 |
| Drying ratio X of ink discharged first | 20 percent | 20 percent |
| Sequence of discharging | White ink to non-white ink | White ink to non-white ink |
| Heating temperature T | 55 degrees C. | |
| White bleed (rating) | B | A |

TABLE V-4-continued

| | Example/Comparative Example V- No. | |
|---|---|---|
| | Example V-10 | Comparative Example V-4 |
| Ink set | 13 | 14 |
| White ink or clear ink discharged first | WI-13 | WI-14 |
| Non-white ink discharged after white ink or clear ink | OC1 | OC1 |
| Drying ratio X of ink discharged first | 20 percent | 20 percent |
| Sequence of discharging | White ink to non-white ink | White ink to non-white ink |
| Heating temperature T | 55 degrees C. | |
| White bleed (rating) | B | C |

TABLE V-5

| | Example/Comparative Example No. | | |
|---|---|---|---|
| | Example V-1 | Example V-10 | Comparative Example V-5 |
| Ink set | 1 | 13 | 14 |
| White ink or clear ink discharged first | WI-1 | WI-13 | WI-14 |
| Non-white ink discharged after white ink or clear ink | OC1 | OC1 | OC1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| White Bleed (rating) | A | B | C |

| | Example/Comparative Example No. | |
|---|---|---|
| | Example V-11 | Example V-12 |
| Ink set | 1 | 13 |
| White ink or clear ink discharged first | WI-1 | WI-13 |
| Non-white ink discharged after white ink or clear ink | OC1 | OC1 |
| Drying ratio X of ink discharged first | 30 percent | 30 percent |
| Sequence of discharging | White ink to non- | White ink to non- |

TABLE V-5-continued

| | | |
|---|---|---|
| | white ink | white ink |
| Heating temperature T | 55 degrees C. | |
| White Bleed (rating) | A | B |

| | Example/Comparative Example No. | |
|---|---|---|
| | Comparative Example V-6 | Reference Example V-1 |
| Ink set | 14 | 1 |
| White ink or clear ink discharged first | WI-14 | WI-1 |
| Non-white ink discharged after white ink or clear ink | OC1 | OC1 |
| Drying ratio X of ink discharged first | 30 percent | 35 percent |
| Sequence of discharging | White ink to non-white ink | White ink to non-white ink |
| Heating temperature T | 55 degrees C. | |
| White Bleed (rating) | C | A |

| | Example/Comparative Example No. | | |
|---|---|---|---|
| | Reference Example V-2 | Reference Example V-3 | Reference Example V-4 |
| Ink set | 13 | 14 | 1 |
| White ink or clear ink discharged first | WI-13 | WI-14 | WI-1 |
| Non-white ink discharged after white ink or clear ink | OC1 | OC1 | OC1 |
| Drying ratio X of ink discharged first | 35 percent | 35 percent | 40 percent |
| Sequence of discharging | White ink to non-white ink | White ink to non-white ink | White ink to non-white ink |
| Heating temperature T | | 55 degrees C. | |
| White bleed (rating) | B | B | A |

| | Example/Comparative Example No. | |
|---|---|---|
| | Reference Example V-5 | Reference Example V-6 |
| Ink set | 13 | 14 |
| White ink or clear ink discharged first | WI-13 | WI-14 |
| Non-white ink discharged after white ink or clear ink | OC1 | OC1 |
| Drying ratio X of ink discharged first | 40 percent | 40 percent |
| Sequence of discharging | White ink to non-white ink | White ink to non-white ink |
| Heating temperature T | 55 degrees C. | |
| White bleed (rating) | A | B |

TABLE V-6

| | Example/Comparative Example No. | | |
|---|---|---|---|
| | Example V-13 | Example V-14 | Example V-15 |
| Ink set | 1 | 9 | 10 |
| White ink or clear ink discharged first | WI-1 | WI-9 | WI-10 |
| Non-white ink discharged after white ink or clear ink | OC1 | OC1 | OC1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| Heating temperature T | 40 degrees C. | 40 degrees C. | 40 degrees C. |
| White bleed (rating) | A | B | B |

| | Example/Comparative Example No. | | |
|---|---|---|---|
| | Example V-1 | Example V-6 | Example V-7 |

TABLE V-6-continued

| | | | |
|---|---|---|---|
| Ink set | 1 | 9 | 10 |
| White ink or clear ink discharged first | WI-1 | WI-9 | WI-10 |
| Non-white ink discharged after white ink or clear ink | OC1 | OC1 | OC1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink or clear ink | −31 degrees C. | 75 degrees C. | 40 degrees C. |
| Heating temperature T | 55 degrees C. | 55 degrees C. | 55 degrees C. |
| White bleed (rating) | A | A | B |

| | Example/Comparative Example No. | | |
|---|---|---|---|
| | Example V-16 | Example V-17 | Example V-18 |
| Ink set | 1 | 9 | 10 |
| White ink or clear ink discharged first | WI-1 | WI-9 | WI-10 |
| Non-white ink discharged after white ink or clear ink | OC1 | OC1 | OC1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink or clear ink | −31 degrees C. | 75 degrees C. | 40 degrees C. |
| Heating temperature T | 90 degrees C. | 90 degrees C. | 90 degrees C. |
| White bleed (rating) | A | A | A |

Examples VI-1 to VI-4, Examples VI-6 to VI-18, Comparative Examples VI-2 to VI-8, and Reference Examples VI-1 to VI-6

Using each ink prepared as described above, solid images were formed and evaluated in the same manner as in Example I-1 except that the white ink was discharged first and thereafter the non-white ink including no coloring material was discharged thereon.

The evaluation results are shown in Table VI-1 to VI-6.

TABLE VI-1

| | Example/Comparative Example No. | |
|---|---|---|
| | Example VI-1 | Example VI-2 |
| Ink set | 1 | 2 |
| White ink or clear ink discharged first | WII-1 | WII-2 |
| Non-white ink discharged after white ink or clear ink | UC1 | UC1 |
| Drying ratio X of ink discharged first | 20 percent | 20 percent |
| Sequence of discharging | White ink to non-white ink | White ink to non-white ink |
| Heating temperature T | 55 degrees C. | |
| White bleed (rating) | A | A |

TABLE VI-2

| | Example/Comparative Example No. | | |
|---|---|---|---|
| | Example VI-1 | Example VI-3 | Example VI-4 |
| Ink set | 1 | 4 | 5 |
| White ink or clear ink discharged first | WII-1 | WII-4 | WII-5 |
| Non-white ink discharged after white ink | UC1 | UC1 | UC1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| White bleed (rating) | A | A | A |

TABLE VI-2-continued

| | Example/Comparative Example No. | |
|---|---|---|
| | Example VI-1 | Example VI-2 |
| Ink set | 6 | 7 |
| White ink or clear ink discharged first | WII-6 | WII-7 |
| Non-white ink discharged after white ink or clear ink | UC1 | UC1 |
| Drying ratio X of ink discharged first | 20 percent | 20 percent |
| Sequence of discharging | White ink to non-white ink | White ink to non-white ink |
| Heating temperature T | 55 degrees C. | |
| White bleed (rating) | C | C |

TABLE VI-3

| | Example/Comparative Example No. | | |
|---|---|---|---|
| | Example VI-1 | Comparative Example VI-3 | Comparative Example VI-7 |
| Ink set | 1 | 8 | 1 |
| White ink or clear ink discharged first | WII-1 | WII-8 | WII-1 |
| Non-white ink discharged after white ink or clear ink | UC1 | UC1 | K2 |
| Drying ratio X of ink discharged first | 20 percent | 20 percent | 20 percent |

TABLE VI-3-continued

| | Example/Comparative Example No. | | |
|---|---|---|---|
| | Example VI-1 | Comparative Example VI-3 | Comparative Example VI-7 |
| Sequence of discharging | White ink to non-white ink | White ink to non-white ink | White ink to non-white ink |
| Heating temperature T | | 55 degrees C. | |
| Bleed (rating) | A | D | D |

TABLE VI-4

| | Example/Comparative Example No. | | |
|---|---|---|---|
| | Example VI-1 | Example VI-6 | Example VI-7 |
| Ink set | 1 | 9 | 10 |
| White ink or clear ink discharged first | WII-1 | WII-9 | WII-10 |
| Non-white ink discharged after white ink or clear ink | UC1 | UC1 | UC1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| Bleed (rating) | A | A | B |

TABLE VI-4-continued

| | Example/Comparative Example No. | |
|---|---|---|
| | Example VI-8 | Example VI-9 |
| Ink set | 11 | 12 |
| White ink or clear ink discharged first | WII-11 | WII-12 |
| Non-white ink discharged after white ink or clear ink | UC1 | UC1 |
| Drying ratio X of ink discharged first | 20 percent | 20 percent |
| Sequence of discharging | White ink to non-white ink | White ink to non-white ink |
| Heating temperature T | 55 degrees C. | |
| Bleed (rating) | B | A |

| | Example/Comparative Example No. | |
|---|---|---|
| | Example VI-10 | Comparative Example VI-4 |
| Ink set | 13 | 14 |
| White ink or clear ink discharged first | WII-13 | WII-14 |
| Non-white ink discharged after white ink or clear ink | UC1 | UC1 |
| Drying ratio X of ink discharged first | 20 percent | 20 percent |
| Sequence of discharging | White ink to non-white ink | White ink to non-white ink |
| Heating temperature T | 55 degrees C. | |
| Bleed (rating) | B | C |

TABLE VI-5

| | Example/Comparative Example No. | | |
|---|---|---|---|
| | Example VI-1 | Example VI-10 | Comparative Example VI-5 |
| Ink set | 1 | 13 | 14 |
| White ink or clear ink discharged first | WII-1 | WII-13 | WII-14 |
| Non-white ink discharged after white ink | UC1 | UC1 | UC1 |
| Drying ratio X of ink discharged first | 20 percent | 20 percent | 20 percent |
| Sequence of discharging | White ink to non-white ink | White ink to non-white ink | White ink to non-white ink |
| Heating temperature T | | 55 degrees C. | |
| Bleed (rating) | A | B | C |

| | Example/Comparative Example No. | |
|---|---|---|
| | Example VI-8 | Example VI-9 |
| Ink set | 11 | 12 |
| White ink or clear ink discharged first | WII-11 | WII-12 |
| Non-white ink discharged after white ink or clear ink | UC1 | UC1 |
| Drying ratio X of ink discharged first | 20 percent | 20 percent |
| Sequence of discharging | White ink to non-white ink | White ink to non-white ink |
| Heating temperature T | 55 degrees C. | |
| Bleed (rating) | B | A |

| | Example/Comparative Example No | |
|---|---|---|
| | Example VI-10 | Comparative Example VI-4 |
| Ink set | 13 | 14 |
| White ink or clear ink discharged first | WII-13 | WII-14 |

TABLE VI-5-continued

| | | |
|---|---|---|
| Non-white ink discharged after white ink or clear ink | UC1 | UC1 |
| Drying ratio X of ink discharged first | 20 percent | 20 percent |
| Sequence of discharging | White ink to non-white ink | White ink to non-white ink |
| Heating temperature T | 55 degrees C. | |
| Bleed (rating) | B | C |

| | Example/Comparative Example No. | | |
|---|---|---|---|
| | Reference Example VI-2 | Reference Example VI-3 | Reference Example VI-4 |
| Ink set | 13 | 14 | 1 |
| White ink or clear ink discharged first | WII-13 | WII-14 | WII-1 |
| Non-white ink discharged after white ink or clear ink | UC1 | UC1 | UC1 |
| Drying ratio X of ink discharged first | 35 percent | 35 percent | 40 percent |
| Sequence of discharging | White ink to non-white ink | White ink to non-white ink | White ink to non-white ink |
| Heating temperature T | | 55 degrees C. | |
| Bleed (rating) | B | B | A |

| | Example/Comparative Example No. | |
|---|---|---|
| | Reference Example VI-5 | Reference Example VI-6 |
| Ink set | 13 | 14 |
| White ink or clear ink discharged first | WII-13 | WII-14 |
| Non-white ink discharged after white ink or clear ink | UC1 | UC1 |
| Drying ratio X of ink discharged first | 40 percent | 40 percent |
| Sequence of discharging | White ink to non-white ink | White ink to non-white ink |
| Heating temperature T | 55 degrees C. | |
| Bleed (rating) | A | B |

TABLE VI-6

| | Example/Comparative Example No. | | |
|---|---|---|---|
| | Example VI-13 | Example VI-14 | Example VI-15 |
| Ink set | 1 | 9 | 10 |
| White ink or clear ink discharged first | WII-1 | WII-9 | WII-10 |
| Non-white ink discharged after white ink or clear ink | UC1 | UC1 | UC1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink or clear ink | −31 degrees C. | 75 degrees C. | 40 degrees C. |
| Heating temperature T | 40 degrees C. | 40 degrees C. | 40 degrees C. |
| Bleed (rating) | A | B | B |

| | Example/Comparative Example No. | | |
|---|---|---|---|
| | Example VI-1 | Example VI-6 | Example VI-7 |
| Ink set | 1 | 9 | 10 |
| White ink or clear ink discharged first | WII-1 | WII-9 | WII-10 |
| Non-white ink discharged after white ink | UC1 | UC1 | UC1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink or clear | −31 degrees C. | 75 degrees C. | 40 degrees C. |

TABLE VI-6-continued

| | | | |
|---|---|---|---|
| ink | | | |
| Heating temperature T | 55 degrees C. | 55 degrees C. | 55 degrees C. |
| Bleed (rating) | A | A | B |

| | Example/Comparative Example No. | | |
|---|---|---|---|
| | Example VI-16 | Example VI-17 | Example VI-18 |
| Ink set | 1 | 9 | 10 |
| White ink or clear ink discharged first | WII-1 | WII-9 | WII-10 |
| Non-white ink discharged after white ink or clear ink | UC1 | UC1 | UC1 |
| Drying ratio X of ink discharged first | 20 percent | 20 percent | 20 percent |
| Sequence of discharging | White ink to non-white ink | White ink to non-white ink | White ink to non-white ink |
| Resin Tg in white ink | −31 degrees C. | 75 degrees C. | 40 degrees C. |
| Heating temperature T | 90 degrees C. | 90 degrees C. | 90 degrees C. |
| Bleed (rating) | A | A | A |

According to the present disclosure, a print method is provided which is capable of printing on various substrates such as recording medium at high speed and producing printed matter free of color bleed with high quality

Having now fully described embodiments of the present invention, it will be apparent to one of ordinary skill in the art that many changes and modifications can be made thereto without departing from the spirit and scope of embodiments of the invention as set forth herein.

What is claimed is:

1. A print method comprising:

applying a first ink set to a recording medium to form a first ink print layer;

drying the first ink print layer to a drying ratio of 30 percent or less; and applying a second ink having a color different from a color of the first ink to the first ink print layer dried to the drying ratio of 30 percent or less to form a second ink print layer directly on the first ink print layer, wherein the first ink comprises a urethane resin particle and a water-soluble organic solvent having a boiling point of from 100 to 180 degrees C. or β-alkoxy propionamide represented by the following Chemical formula I, (I)

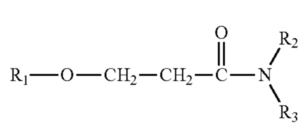

where $R_1$ represents a methyl group, an ethyl group, a propyl group, or a butyl group and $R_2$ and $R_3$ each, independently represent alkyl groups having one to six carbon atoms, and wherein the first ink and the second ink comprise no organic solvent having a boiling point of 280 degrees C. or higher under 1 atmospheric pressure, and wherein the water-soluble organic solvent includes at least one selected from the group consisting of ethylene glycol monomethylether, ethylene glycol monoethylether, ethylene glycol monopropylether, ethylene glycol monobutylether, propylene glycol monomethyl ether, propylene glycol monoethyl ether, propylene glycol monopropylether, methoxybutanol, 3-methyl-3-methoxybutanol, diethylene glycol dimethylether, diethylene glycol methylethylether, diethylene glycol methylether acetate, and ethyl lactate.

2. The print method according to claim 1, wherein the first ink comprises an ink including a white coloring material or an ink comprising no coloring material and the second ink comprises a non-white coloring material.

3. The print method according to claim 1, wherein the first ink comprises a non-white coloring material and the second ink comprises an ink including a white coloring material or an ink comprising no coloring material.

4. The print method according to claim 1, wherein the water-soluble organic solvent includes at least one selected from the group consisting of propylene glycol monomethyl ether, methoxybutanol, and 3-methyl-3-methoxy butanol.

5. The print method according to claim 1, wherein the urethane resin particle includes water-dispersible particulate.

6. The print method according to claim 1, wherein the urethane resin particle includes a polyether-based urethane resin particle or a polycarbonate-based urethane resin particle.

7. The print method according to claim 6, wherein the urethane resin particle has a glass transition temperature not higher than a temperature of the recording medium when the first ink lands on the recording medium.

8. The print method according to claim 7, wherein the urethane resin particle has a glass transition temperature of 60 degrees C. or lower.

9. The print method according to claim 7, wherein the urethane resin particle includes a water-dispersible urethane resin particle having a glass transition temperature of 0 degrees C. or lower.

10. The print method according to claim 1, wherein the recording medium includes a non-permeable substrate absorbing little or no water.

11. An ink set comprising:

a first ink comprising a water-soluble organic solvent having a boiling point of from 100 to 180 degrees C. or β-alkoxy propionamide represented by the following Chemical formula I and a urethane resin particle,

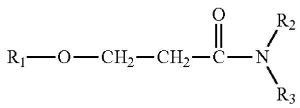

(I)

where $R_1$ represents a methyl group, an ethyl group, a propyl group, or a butyl group and $R_2$ and $R_3$ each, independently represent alkyl groups having one to six carbon atoms; and a second ink having a color different from a color of the first ink, wherein the first ink and the second ink comprise no organic solvent having a boiling point of 280 degrees C. or higher under 1 atmospheric pressure, and wherein the first ink and second ink are used in a print method including applying the first ink to a recording medium to form a first ink print layer, drying the first ink print layer to a drying ratio of 30 percent or less, and applying the second ink having a color different from a color of the first ink to the first ink print layer dried to the drying ratio of 30 percent or less to form a second ink print layer directly on the first ink print layer wherein the water-soluble organic solvent includes at least one selected from the group consisting of ethylene glycol monomethylether, ethylene glycol monoethylether, ethylene glycol monopropylether, ethylene glycol monobutylether, propylene glycol monomethyl ether, propylene glycol monoethyl ether, propylene glycol monopropylether, methoxybutanol, 3-methyl-3-methoxybutanol, diethylene glycol dimethylether, diethtylene glycol methylethylether, diethylene glycol methylether acetate, and ethyl lactate.

12. An inkjet print device comprising:

the ink set of claim 11; and a recording head configured to discharge the first ink and the second ink of the ink set.

13. The print method of claim 1, wherein the first ink print layer is applied by an inkjet method.

14. The print method of claim 2, wherein a proportion of the non-white coloring material in the second ink is from 0.1 to 15 percent by mass, based on a total mass of the second ink.

15. The print method of claim 4, wherein a proportion of the non-white coloring material in the first ink is from 0.1 to 15 percent by mass, based on a total mass of the second ink.

* * * * *